United States Patent
Kabasawa et al.

(10) Patent No.: US 9,310,200 B2
(45) Date of Patent: Apr. 12, 2016

(54) SENSOR DEVICE REGULATION AND RELATED SYSTEMS AND METHODS

(71) Applicant: Sony Corporation, Tokyo (JP)

(72) Inventors: Hidetoshi Kabasawa, Saitama (JP); Shigeto Watanabe, Miyagi (JP)

(73) Assignee: Sony Corporation, Tokyo (JP)

( * ) Notice: Subject to any disclaimer, the term of this patent is extended or adjusted under 35 U.S.C. 154(b) by 306 days.

(21) Appl. No.: 13/927,299

(22) Filed: Jun. 26, 2013

(65) Prior Publication Data

US 2014/0007682 A1  Jan. 9, 2014

(30) Foreign Application Priority Data

Jul. 3, 2012 (JP) .................................. 2012-149228

(51) Int. Cl.
*G01P 1/02* (2006.01)
*G01C 19/56* (2012.01)
*G01C 19/5656* (2012.01)

(52) U.S. Cl.
CPC ............ *G01C 19/56* (2013.01); *G01C 19/5656* (2013.01); *G01P 1/023* (2013.01)

(58) Field of Classification Search
CPC ............... G01C 19/56; G01C 19/5719; G01C 19/5656; G01P 1/023; G01P 1/006; G01P 15/0802
USPC ........... 73/493, 431, 504.12, 504.14, 504.04, 73/504.02, 504.16

See application file for complete search history.

(56) References Cited

U.S. PATENT DOCUMENTS

| | | | | |
|---|---|---|---|---|
| 6,094,981 A | * | 8/2000 | Hochstein | 73/170.17 |
| 6,708,564 B2 | * | 3/2004 | Ishikawa et al. | 73/493 |
| 6,979,873 B2 | * | 12/2005 | Fujii | 257/417 |
| 7,249,509 B2 | * | 7/2007 | Hirano | 73/504.12 |
| 7,513,154 B2 | * | 4/2009 | Ino | 73/493 |
| 7,603,903 B2 | * | 10/2009 | Ohta | 73/504.12 |
| 8,225,660 B2 | * | 7/2012 | Sakai et al. | 73/504.12 |
| 8,256,288 B2 | * | 9/2012 | Matsunaga | 73/493 |
| 8,826,734 B2 | * | 9/2014 | Ohkoshi et al. | 73/493 |
| 2003/0154787 A1 | * | 8/2003 | Yoshiuchi et al. | 73/493 |
| 2005/0217373 A1 | * | 10/2005 | Ishikawa et al. | 73/493 |
| 2007/0044557 A1 | * | 3/2007 | Takemasa et al. | 73/493 |
| 2010/0307242 A1 | * | 12/2010 | Sakai et al. | 73/504.12 |

* cited by examiner

*Primary Examiner* — Helen Kwok

(74) *Attorney, Agent, or Firm* — Wolf, Greenfield & Sacks, P.C.

(57) ABSTRACT

A sensor device includes a sensor element; and a wiring substrate having a first joint surface electrically joined with the sensor element, a substrate body that contains an organic insulating material and in which an electronic component is embedded, and a regulation part that regulates the first joint surface from deforming.

19 Claims, 15 Drawing Sheets

→ Vibration direction
→ Coriolis force

→ Vibration direction
→ Coriolis force

SENSOR DEVICE REGULATION AND RELATED SYSTEMS AND METHODS

CROSS REFERENCE TO RELATED APPLICATIONS

This application claims priority to Japanese Priority Patent Application JP 2012-149228, filed in the Japan Patent Office on Jul. 3, 2012, the entire content of which is hereby incorporated by reference.

BACKGROUND

The present technology relates to a sensor device on which a sensor element such as a vibrating gyrosensor is mounted.

As an angular velocity sensor, for example, a vibrating gyrosensor is well known. A vibrating gyrosensor detects, while vibrating a vibrator at a predetermined frequency, a Coriolis force generated on the vibrator with a piezoelectric element to detect an angular velocity. A vibrating gyrosensor (hereinafter, referred to as sensor device) is typically mounted in parallel with an integrated circuit (IC) that detects an oscillation or an angular velocity of a vibrator as a package component on the same substrate (refer to Japanese Patent Application Laid-open No. 2010-230691).

Now, in view of miniaturization of an electronic device to be mounted, also a sensor device is demanded to be further smaller and cheaper. However, since the above-described mounting method demands a foot print that can mount at least the sensor and IC, the method was disadvantageous from the viewpoint of pursuing miniaturization and low cost.

There, Japanese Unexamined Patent Application Publication No. 2011-164091 describes a sensor device having a structure where a housing part for housing a controller (IC) is formed in a multi-layered wiring substrate configured of ceramics and a gyrosensor is disposed on the housing part. The gyrosensor is formed into a rectangular triaxial gyrosensor as a whole and mounted in the housing part while stepping over a mounted controller. Thus, by overlapping mounting regions of the gyrosensor and controller, a footprint can be reduced.

SUMMARY

However, there was a problem that since, in the sensor device described in Japanese Unexamined Patent Application Publication No. 2011-164091, the housing part is a recess part formed on a surface of a wiring substrate, a rectangular gyrosensor that is mounted by stepping over the recess part has to be formed with a length longer than that of the housing part in either one of horizontal and vertical lengths. Therefore, there was a problem that a gyrosensor may not be sufficiently miniaturized. Further, in the case where many pieces of the gyrosensors are formed from one wafer by a MEMS process, since miniaturization of the gyrosensor is limited, the number of pieces may not be increased, resulting in limiting also the cost reduction.

In view of such the situation, it is desirable to provide a sensor device that can realize miniaturization and cost reduction.

A sensor device according to an embodiment of the present technology includes a sensor element and a wiring substrate.

The wiring substrate includes a first joint surface that is electrically joined with the sensor element, a substrate body that contains an organic insulator and in which an electronic component is embedded, and a regulation part that regulates the first joint surface from deforming.

The regulation part regulates a first joint surface that is joined with a sensor element from deforming. Thereby, even when an organic insulator of a substrate body is deformed by heat or vibration, a structure of a first joint surface is hardly affected by these influences. Thus, a sensor element can stably maintain desired sensor characteristics.

The first joint surface is disposed on the substrate body, and the regulation part may contain a core part embedded in the substrate body.

When the core part suppresses the substrate body from deforming, the first joint surface can be regulated from deforming.

The core part may have a specific structure where the core part is annularly disposed around the electronic component.

Thereby, the core part can be disposed space-savingly and can isotropically suppress the substrate body from thermally expanding and elastically deforming.

The wiring substrate further includes a second joint surface that faces the first joint surface, and the substrate body may further include a first wiring layer disposed on a side of the first joint surface, and a second wiring layer that is disposed on a side of the second joint surface and faces the first wiring layer with the core part and the electronic component interposed therebetween.

Herewith, a substrate body can be formed into a multi-layer substrate and a degree of freedom of wiring design can be improved.

The sensor device may further include a shield part that is disposed on the first joint surface and covers the sensor element.

Thereby, a sensor element can be protected from intrusion of an external electromagnetic wave and irregularity of sensor characteristics can be suppressed. Further, a sensor element has a light-shielding function and also thereby an operation of a sensor element can be stabilized. Still further, a shield part has a function as a cover of a sensor device and can improve a handling property.

The regulation part may further include a first junction part that joins the shield part and the core part.

In the shield part, an absolute value of a difference of a linear expansion coefficient thereof and that of the sensor element may be smaller than an absolute value of a difference of linear expansion coefficients of the organic insulator and the sensor element.

Herewith, a shield part, a joint part and a core part as a whole form a large electromagnetic shield and can shield external intrusion of an electromagnetic wave. Further, on a side of a first joint surface of a substrate body, thermal expansion can be more suppressed and a first joint surface can be effectively regulated from deforming.

In the core part, an absolute value of a difference of a linear expansion coefficient thereof and that of the sensor element may be smaller than an absolute value of a difference of linear expansion coefficients of the organic insulator and the sensor element.

Thus, a core part can be formed with a material having a value of a linear expansion coefficient closer to that of a sensor element than an organic insulator. Thereby, thermal expansion of a substrate body and a first joint surface can be suppressed and strain stress in a sensor element can be suppressed from being generated.

The regulation part includes a base material configured of an inorganic insulator, which is disposed between the sensor element and the substrate body, and the first joint surface may be disposed on the base material.

Since the base material is configured of an inorganic insulator such as ceramics, also the first joint surface is regulated from deforming. Thereby, a sensor element can stably maintain its sensor characteristics. As the inorganic insulator, other than ceramics, for example, Si and MgO can be applied.

The regulation part may further include a core part that is embedded in the substrate body.

Herewith, a base material and a core part can regulate an entire wiring substrate from deforming. Accordingly, also when a sensor device is mounted on other regulation substrate via a wiring substrate, sensor characteristics can be more stably maintained.

The regulation part may further include a second joint part that joins the base material and the core part.

Thereby, since a base material can be fixed to a core part, an elastic deformation of a first joint surface accompanying vibration of a sensor element is more suppressed, thus, rigidity can be more improved. Accordingly, desired sensor characteristics of a sensor element can be maintained.

The base material is mounted on the substrate body, and the wiring substrate may further have an adhesion layer that is filled in between the base material and the substrate body.

Herewith, a joint region of a base material and a substrate body can be protected from intrusion of external humidity and moisture or from external stress. Thus, joint reliability between a base material and a substrate body can be increased.

The base material is disposed to face the first joint surface and may further have a third joint surface that is electrically joined with the electronic component.

Thereby, rigidity of a base material can be increased and a thickness of a substrate body can be formed thinner.

The sensor device may further include a shield part that is disposed on the wiring substrate and covers the sensor element.

For example, the shield part may be disposed on the first joint surface.

Alternatively, the substrate body has a fourth joint surface that faces the base material, and the shield part is disposed on the fourth joint surface and may cover the base material and the sensor element.

Thereby, a shield effect can be imparted to a sensor element and wiring in a base material. Further, a shield part can protect a joint region of a sensor element and a base material from intrusion of external humidity and moisture and external stress. Thus, operational reliability as a sensor device can be more increased.

The substrate body may be formed with a longitudinal elastic modulus smaller than that of the base material.

Thereby, when a wiring substrate is mounted on a not-shown regulation substrate, a so-called damper effect can be exerted. By the damper effect, stress due to attachment distortion is mitigated and an influence on a sensor element can be suppressed.

The sensor element may face the electronic component with the first joint surface interposed therebetween.

Thereby, mounting areas of a sensor element and an electronic component can be overlapped to be able to contribute to miniaturize a sensor device.

The sensor element may be a gyrosensor, for example.

Since in the sensor device, a sensor element is disposed on a first joint surface, even when a sensor element is a gyrosensor, a vibrator is not disturbed from vibrating. Further, even when, in order to correct vibration characteristics caused by shape asymmetry of a vibrator, a laser process is performed to adjust a shape while confirming an output signal after mounting, there is nothing that disturbs laser irradiation, that is, a laser process can be readily performed.

As was described above, according to the present technology, a sensor device that is capable of realizing miniaturization and cost reduction can be provided.

These and other objects, features and advantages of the present technology will become more apparent in light of the following detailed description of best mode embodiments thereof, as illustrated in the accompanying drawings.

DETAILED DESCRIPTION OF EMBODIMENTS

Hereinafter, embodiments according to the present technology will be described with reference to drawings.

<First Embodiment>

Figure 1:
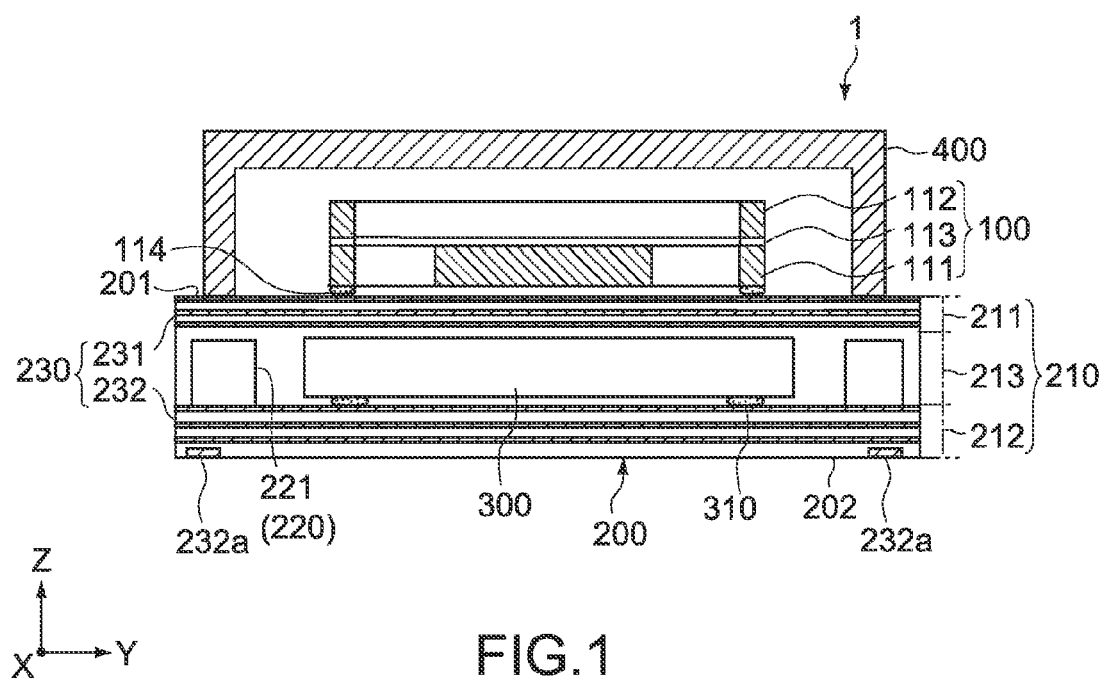
FIG. 1 is a schematic sectional view of a sensor device according to a first embodiment of the present technology.
Figure 2:
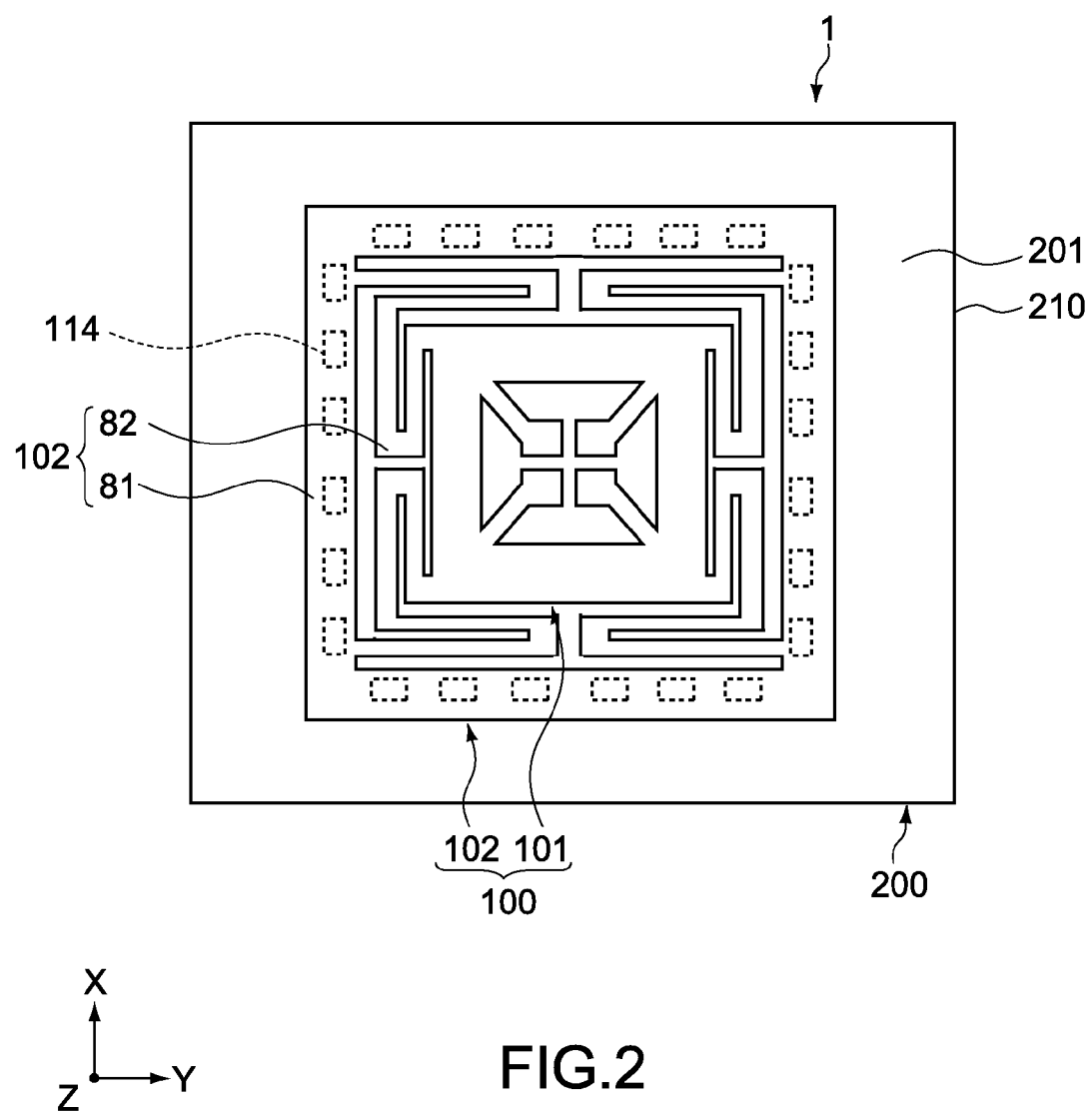
FIG. 2 is a schematic plan view of a main part of the sensor device.

FIG. 1 is a schematic sectional view showing a sensor device according to a first embodiment of the present technology. A sensor device 1 of the present embodiment includes a sensor element 100, a wiring substrate 200 and a shield part 400. The sensor element 100 is formed as a gyrosensor element in the present embodiment. FIG. 2 is a schematic plan view of the sensor device 1 seen by removing the shield part 400. In the drawing, an X-axis direction shows a vertical direction of the sensor device 1, a Y-axis direction shows a horizontal direction thereof, a Z-axis direction shows a thickness direction thereof, and each thereof is orthogonal with each other.

The sensor device 1 shown in FIG. 1 is formed as a single package component that is formed into a nearly rectangular parallelepiped as a whole. That is, the sensor element 100 is surface mounted on a first joint surface 201 on the wiring substrate 200 by a flip-chip process, for example, and is covered with a cap-like shield part 400 that was similarly joined on to the first joint surface 201. The sensor device 1 has a structure, in the present embodiment, with a dimension of a width and a depth each of about 3 mm and a thickness of about 1 mm.

Further, the wiring substrate 200 is formed as a component-incorporated substrate and has an electronic component 300 disposed inside thereof. In the present embodiment, the electronic component 300 is a controller 300 that controls the sensor element 100 and is configured of an integrated circuit (IC), for example. The sensor element 100 is disposed to face a controller 300 with the first joint surface 201 interposed therebetween.

[General Outline of Sensor Element]

The sensor element 100 includes, as will be described below, a vibrator part 101 having a plurality of vibration parts, and a frame body 102 that supports the vibrator part 101. The sensor element 100 is formed as a gyrosensor element that generates signals corresponding to an angular velocity about each of axes along predetermined two directions in the X-Y plane and an angular velocity about a Z-axis along a direction vertical to the X-Y plane.

In the present embodiment, the sensor element 100 is configured of a material containing silicon (Si). For example, the sensor element 100 is formed by microprocessing an SOI (Silicon On Insulator) substrate that is obtained by adhering two sheets of silicon (Si) substrates and includes a first layer 111, a second layer 112 and a joining layer 113 that joins first and second layers 111 and 112.

Each of the first and second layers 111 and 112 is formed of a silicon substrate, and a joining layer 113 is formed from a silicon oxide film. A first layer 111 forms the vibrator part 101 and the frame body 102 respectively, a second layer 112 is formed in frame along a periphery of a first layer 111. First and second layers 111 and 112 each is formed into a near rectangle having a square or rectangular plane shape and with the same or nearly the same magnitude. In the present embodiment, first and second layers 111 and 112 are formed into a square shape having a side of about 1.7 mm.

The first layer 111 has a front surface to which a second layer 112 is joined and a back surface that faces the wiring substrate 200. On a back surface of the first layer 111, a plurality of terminal parts 114 that is electrically joined with the wiring substrate 200 is formed.

The terminal part 114 has, in the present embodiment, an electrode pad and a solder bump formed thereon, and every six pieces the terminal parts 114 are arranged on each of sides, for example, along a periphery of the first layer 111. Further, a terminal part 114 may contain, without limiting a configuration that contains a solder bump, instead of a solder bump, a plating bump.

Each of the terminal parts 114 is formed, for example, on a not-shown insulating film that covers a back surface of the first layer 111. Herewith, each of the terminal parts 114 is prevented from short-circuiting via the first layer 111 that is formed from single crystal silicon. The insulating film is typically formed of a silicon oxide film without limiting thereto.

By forming each of the first and second layers 111 and 112 by setting a length of a diagonal line to 10 mm or less, further 5 mm or less (in the present embodiment, for example, about 2.4 mm), also the maximum dimension between a plurality of terminal parts 114 can be set to 10 mm or less. Thus, even when stress such as strain stress or thermal strain stress is loaded on a joint part including the terminal parts 114, an amount of strain of a substrate body 210 with respect to that of the sensor element 100 can be suppressed to a relatively minor degree.

The frame body 102 has a base part 81 and a coupling part 82. The base part 81 has the terminal part 114 and is formed in a nearly rectangular frame that surrounds an outer side of the vibrator part 101. The coupling part 82 couples between the base part 81 and the vibrator part 101 and has a shape deformable in the X-Y plane. Thereby, without disturbing a vibration of the vibrator part 101 described below, the vibrator part 101 can be supported.

The base part 81 of the sensor element 100 is surface mounted with respect to the substrate body 210 of the wiring substrate 200 by a flip-chip process. Since, in the present embodiment, a frame-shaped second layer 112 is formed corresponding to a region for forming the terminal part 114, a second layer 112 works as a reinforcement layer during mounting. Thereby, the sensor element 100 can be prevented from being broken during mounting. Further, the sensor element 100 can be easily handled during manufacture.

[Wiring Substrate]

The wiring substrate 200 includes the first joint surface 201, the substrate body 210, and a regulation part 220. The substrate body 210 is, as a whole, formed into a multi-layered wiring substrate having a rectangular plane shape, and on a front surface and a back surface and inside of the substrate body 210, a wiring layer 230 having a predetermined pattern is formed.

(First Joint Surface)

The first joint surface 201 is disposed to form a top surface of the substrate body 210 and includes a plurality of lands for electrically joined with the terminal parts 114 of the sensor element 100. Such land part forms a part of a wiring layer 230. As an electrical joining method between the sensor element 100 and the first joint surface 201, without limiting to a soldering method, a joining material such as a conductive adhesive may be used, and a joining technology such as an ultrasonic joining process may be used. In the present embodiment, the first joint surface 201 and the sensor element 100 are electromechanically joined by a flip-chip process.

The first joint surface 201 may have, for example, a rectangular recess part formed in a region that faces the vibrator part 101 of the sensor element 100 (not shown in the drawing). The recess part is formed into, for example, a square plane shape having a side of about 0.9 mm and has a depth of about 50 μm. Further, since a height of the terminal part 114 after joining the sensor element 100 and the wiring substrate 200 is about 20 to 30 μm, as a whole, between the vibrator part 101 of the sensor element 100 and the first joint surface 201, a gap of about 80 μm is formed. Thus, without disturbing distortion modification due to resonance vibration or Coriolis force of the sensor element 100, which will be described below, the sensor element 100 can be stably supported. A depth of the recess part can be formed at about 10 to 100 μm without limiting to the above.

(Substrate Body)

The substrate body 210 has the second joint surface 202 that faces the first joint surface 201 in a thickness direction. The second joint surface 202 forms a bottom surface of the substrate body 210 that is joined with a regulation substrate and is provided with an external connection terminal 232a. A joining method with the regulation substrate is not particularly limited. However, for example, by face down bonding according to a flip-chip process via a solder bump, space-saving mounting can be performed. The regulation substrate is a wiring substrate (mother board) of an electronic instrument (for example, video camera, and car-navigation system) on which the sensor device 1 is mounted, and, other than the sensor device 1, other electronic components may be mounted.

The external connection terminal 232a forms a part of a wiring layer 230 and is formed into a pad part for connecting 25 bumps, for example. In the present embodiment, the substrate body 210 may be formed into a component-incorporated substrate, and, on the second joint surface 202, a pad part can be formed over an entire surface. Thereby, a degree of freedom of disposition of external connection terminals 232a on the second joint surface 202 is increased. Therefore, depending on a configuration of a regulation substrate on which the sensor device 1 is mounted, disposition of external connection terminals 232a can be determined.

The substrate body 210 includes an organic insulator as an insulation layer. In the present embodiment, an epoxy resin containing an additive of filler such as glass fiber is adopted as an organic insulator. In the explanation below, even when an additive such as glass fiber is added, in some cases, only an "epoxy resin" is used.

Further, between organic insulation layers of the substrate body 210, a wiring layer 230 is arbitrarily disposed. The wiring layer 230 includes an upper wiring layer (first wiring layer) 231 and a lower wiring layer (second wiring layer) 232. These wiring layers 230 are typically formed of a copper foil, and each of wiring layers is electrically connected with each other via a via. The number of layers of the top wiring layer 231 and bottom wiring layer 232 can be arbitrarily set without limiting to that of an illustrated example.

The substrate body 210 has three regions different in its internal structure. That is, the substrate body 210 includes a first region 211 that contains the first joint surface 201, a second region 212 that contains the second joint surface 202, and a third region 213 that is disposed between the first and second regions 211, 212 and where a controller 300 is embedded.

Each of the first and second regions 211 and 212 has a structure where a wiring layer 230 and an organic insulating layer are alternately laminated into many layers. In the first region 211, the top wiring layer 231 is formed. The top wiring layer 231 includes a land part formed on the first joint surface 201. In the second region 212, the lower wiring layer 232 is formed. The lower wiring layer 232 is disposed to face the top wiring layer 231 with the controller 300 and a core part 221 interposed therebetween and includes a pad part on the second joint surface 202.

Though omitted from showing in the drawing, the wiring layer 230 includes a grounded circuit, and the top wiring layer 231 may include a grounding terminal connected to the grounded circuit. Herewith, a part of the terminal parts 114 on a side of the sensor element 100 can be joined with the grounding terminal. The grounding terminal may be connected to a predetermined direct current potential without limiting to the case of connecting to a ground potential.

On the other hand, the third region 213 does not have, for example, a wiring layer, but has only an organic insulating layer. In the third region 213, the controller 300 and the core part 221 disposed around the controller are buried. As necessary, the third region 213 may have a wiring layer.

The controller 300 has, as will be described below, a self-oscillation circuit that outputs a driving signal that excites the vibrator part 101, an arithmetic circuit that outputs angular velocities about the X-, Y- and Z-axes based on signals corresponding to the respective angular velocities about the respective axes, a detector circuit and a smoothing circuit.

The controller 300 may include a single IC chip, a semiconductor bare chip, or a semiconductor package component such as CSP (Chip Size Package). The controller 300 is, for example, a near rectangular parallelepiped having a near square shape having a side of about 1.9 mm.

Further, on a back surface (surface joined with lower wiring layer 232) of the controller 300, for example, a plurality of terminal parts 310 may be formed. The terminal part 310 includes, in the present embodiment, an electrode pad and a solder bump formed thereon, and is joined with a land part formed on the lower wiring layer 232 by a flip-chip process. Disposition of the terminal parts 310 is not particularly limited. However, for example, along a periphery of a back surface of the controller 300, for example, every 5 to 10 pieces thereof are arranged on each of sides.

(Process of Manufacturing Substrate Body)

Here, an example of a process of manufacturing the substrate body 210 having the above-described structure will be roughly described. A method for manufacturing the substrate body 210 includes a step of forming a second region 212, a step of forming a third region 213, and a step of forming a first region 211.

Firstly, the second region 212 is formed. In the present step, a build-up process where an organic insulating layer and a wiring layer are alternately laminated may be adopted, or a process where both-sided substrates are laminated via an adhesive layer may be adopted. As the organic insulating layer, a glass-epoxy substrate or a resin sheet with a copper foil can be used. Further, as a method for forming a wiring layer, without particularly limiting, a process for forming a pattern according to, for example, an additive process or a subtractive process, or a transfer process of a copper foil with a releasing film, a screen printing process can be adopted. Further, in the present step, an inter-layer via may be formed according to laser process.

Next, the third region 213 is formed on the second region 212. Firstly, on the upper-most layer of the lower wiring layer 232, the controller 300 and the core part 221 are mounted. The controller 300 is mounted as described above according to a flip-chip process. A method for mounting the core part 221 is not particularly limited. However, a reflow method that uses a solder or an ultrasonic welding method may be adopted. Subsequently, so as to cover the controller 300 and the core part 221, a semi-cured resin layer such as prepreg is formed. The resin layer may be formed by directly coating an epoxy resin on the second region 212 or may be formed by molding the controller 300 and the core part 221 from an adhesive resin layer having a predetermined thickness. These resin layers are cured by heating after molding. Thereby, the third region 213 including an organic insulating layer is formed.

Then, on a substrate where up to second and third regions 212 and 213 have been laminated, according to a process the same as that of the second region 212, a first region 211 is formed. At the end, by using a process such as a laser process or a plating process, a through via that penetrates through the wiring layer 230 is formed on a predetermined position, thus, the substrate body 210 having the configuration is manufactured.

In the substrate body 210 manufactured according to the respective steps, by adopting an organic resin material such as an epoxy resin as an insulating material, the controller 300 can be readily embedded.

For example, when ceramics is used as an insulating material, in order to incorporate the controller 300 in a substrate, a recess part for housing the controller 300 has to be formed with a metal mold, that is, after firing/molding, deflection tends to be caused. Further, in order to bury the controller 300, a top layer for covering the recess part has to be separately prepared, this is disadvantageous from the viewpoint of cost.

In the present embodiment, since a thermosetting resin material such as an epoxy resin or a phenol resin is used as an insulating material, the controller 300 can be embedded in a semi-cured state. Thereby, a step of manufacturing a recess part that houses the controller 300 in an insulating layer becomes unnecessary and the number of steps can be largely reduced. Further, in comparison with a material such as ceramics, manufacture at a lower cost can be realized. As an insulating material, a thermoplastic resin material such as PET (polyethylene terephthalate) or hot-melt may be used.

Also in a manufacturing process other than the manufacturing process, for example, a process for forming from the third region 213 may be adopted. In this case, after forming the third region 213, on each of an upper part and a lower part of the third region 213, a resin layer is formed. These upper and lower resin layers respectively form a part of the first region 211 and the second region 212. And, after a thickness is adjusted by compression pressing in a vertical direction (Z-axis direction), on each of surfaces of the upper and lower resin layers, a pattern for a wiring layer is formed. The wiring layer can be formed by etching after, for example, a plating process was conducted. Further, on each of the wiring layers, a resin layer is formed. By repeating a step of laminating, in a direction separating along a Z-axis direction from the third region 213, the first and second regions 211 and 212 can be formed, respectively. Thus, the substrate body 210 having the above-described structure can be manufactured.

(Regulation Part)

The regulation part 220 has the core part 221. The regulation part 220 is disposed to regulate the first joint surface 201 of the substrate body 210 from deforming. In the present embodiment, "regulation" indicates that by setting a linear expansion coefficient and a longitudinal elastic modulus to values close to those of the sensor element 100, the first joint surface 201 is regulated from thermally expanding and elastically deforming.

The core part 221 is, in the present embodiment, embedded in the third region 213 of the substrate body 210 and disposed rectangular annularly around the controller 300. The core part 221 may be, without limiting thereto, formed into, for example, two bar-like bodies that face with, for example, the controller 300 interposed therebetween. Further, the core part 221 may have electrical conduction with the lower wiring layer 232 via a solder.

Now, a material constituting the core part 221 will be specifically described. The substrate body 210 contains, in the present embodiment, an organic insulating material including an epoxy resin as a main raw material to which a slight amount of glass fiber is added. Thereby, the controller 300 can be readily incorporated and the substrate body 210 can be readily multilayered. However, in comparison with Si that is a material of the sensor element 100, a linear expansion coefficient is high and a longitudinal elastic modulus is low.

Table 1 shows typical examples of values of linear expansion coefficient and longitudinal elastic modulus of some materials including Si and an epoxy resin.

TABLE 1

| Material | Linear expansion coefficient ($\times 10^{-6}/^\circ$ C.) | Longitudinal elastic modulus (GPa) |
| --- | --- | --- |
| Ceramic | 7.0 | 310 |
| Si | 2.4 | 131 to 188 |
| 42 Alloy | 5 | 195 |
| W | 4.4 | 400 |
| Cu | 17 | 130 |
| Epoxy resin | 4 to 160 | 0.06 to 12 |
| Iron (Fe) | 12.1 | 205 |
| Quartz | 12.2 | 77 to 97 |
| Brass | 19 | 103 to 124 |
| Stainless steel | 14.7 | 205 |

When Table 1 is referred, a value of a linear expansion coefficient of an epoxy resin has a width. This is because a value of an epoxy resin varies depending on an additive. For example, an epoxy resin used in the present embodiment, in which a sight amount of glass fiber is added, has a value of about $40 \times 10^{-6}/^\circ$ C. In this case, linear expansion coefficients of Si and the epoxy resin have a difference of about 17 times. On the substrate body 210, also a wiring layer 230 is formed. However, since the organic insulating material predominates in volume, characteristics of the joint surface 201 of the substrate body 210 and the first joint surface 201 are affected by a linear expansion coefficient and a longitudinal elastic modulus of the organic insulating material.

For example, in the case where linear expansion coefficients of the sensor element 100 and the first joint surface 201 of the substrate body 210 are largely different, when the sensor device 1 is used under a temperature different from that during manufacture (during joining), on the sensor element 100 that is joined on the first joint surface 201, strain stress is generated in a plane direction. Thereby, a sensitivity change accompanying a change of a resonance frequency of the sensor element 100 and a change of an output value are generated and desired sensor characteristics may not be obtained. In the case where larger strain stress is generated, a joint region including the terminal part 114 of the sensor element 100 is broken and electrical conduction is cut, which may result in a defect product.

So, the sensor device 1 according to the present embodiment adopts, as a material of the core part 221, a material having a value of a linear expansion coefficient close to that of the sensor element 100. That is, all of core parts 221 are formed from a material that has an absolute value of a difference of a linear expansion coefficient with that of the sensor element 100 containing Si smaller than an absolute value of a difference of linear expansion coefficients of an organic insulating material (epoxy resin) and the sensor element 100.

Here, a material having a value of a linear expansion coefficient "close to that of the sensor element 100" is specifically defined as follows. That is, a material where an absolute value of a difference of a linear expansion coefficient thereof with that of the sensor element 100 (in the case of Si is used to form, about $2.4 \times 10^{-6}/^\circ$ C.) is $20 \times 10^{-6}/^\circ$ C. or less is taken. As such the materials, by referencing to Table 1, for example, iron (Fe), tungsten (W), 42 alloy (alloy containing nickel (Ni): 42%, Fe: 57%: and slight amount of additives such as copper), and ceramics can be cited. In the present embodiment, as the material of the core part 221, for example, a 42 alloy is adopted.

When the core part 221 of the material is annularly formed and embedded inside the substrate body 210, also an entirety of the wiring substrate 200 is formed so that an absolute value of a difference of a linear expansion coefficient thereof with that of the sensor element 100 is smaller than an absolute value of a difference of linear expansion coefficients of an organic insulating material and the sensor element 100, and can be formed with a value of a linear expansion coefficient close to that of the sensor element 100. Therefore, an entire wiring substrate 200 containing the substrate body 210 is regulated from thermally expanding in a plane (X-Y plane) direction and strain stress of the sensor element 100 can be regulated from occurring. Accordingly, inconveniences such as sensitivity change accompanying a change of a resonant frequency of the sensor element 100 and breakdown of an electrical connection in the first joint surface 201 can be suppressed from occurring.

Here, as to relationship of linear expansion coefficients of the sensor element 100 and the core part 221 in sensor elements 100 having different sizes, an experiment like below was conducted. That is, square dummy sensor elements made of two kinds of Si having a side of 10 mm and 5 mm are mounted on an organic insulating substrate in which core parts of various kinds of materials are embedded and reliability of a soldered part was confirmed by heat cycle test from −65° C. to +115° C.

As an example of results, in the case of a side of 10 mm, while in the case where a material of a core part was Cu (linear expansion coefficient: $17 \times 10^6/°$ C.), electrical conduction failure occurred at less than 100 cycles, in the case where a material of a core part was a 42 alloy (linear expansion coefficient: $5 \times 10^{-6}/°$ C.), there was no problem even at 1000 cycles. A linear expansion coefficient of Si is $2.4 \times 10^6/°$ C. It is found from these results that while when $\alpha_{dif} L_{max}$ obtained by multiplying a difference of linear expansion coefficients of a material Si of a sensor element and Cu of a core part $\alpha_{dif}$=about $15 \times 10^{-6}$ mm/° C. by a length of a diagonal line of a sensor element $L_{max}$ (=14 mm) is $210 \times 10^{-6}$ mm/° C., a problem is caused, when $\alpha_{dif} L_{max}$ obtained by multiplying a difference of linear expansion coefficients of Si and a 42 alloy $\alpha_{dif}$=about $3 \times 10^{-6}/°$ C. by a length of a diagonal line of a sensor element $L_{max}$ (=14 mm) is $42 \times 10^{-6}$ mm/° C. or less, there is no problem. Further, in the case of a side of 5 mm, in comparison with the case of a side of 10 mm, when a difference of linear expansion coefficients is about twice, a similar result was obtained. From these, it was confirmed that even when a magnitude of a sensor element is changed, the $\alpha_{dif} L_{max}$ can be used to evaluate.

As a conclusion obtained by summarizing all experimental results, it was found that $\alpha_{dif} L_{max} \leq 105$ is a practically allowable range that satisfies 200 times in the cycle test, and $\alpha_{dif} L_{max} \leq 84$ is a range that satisfies 1000 cycles in the cycle test and can ensure high reliability. Herewith, like in the present embodiment, when the sensor element 100 is formed into a near square shape having a length of a side of about 3 mm or less than that, a length of a diagonal line $L_{max}$ is about 2 mm or less. Therefore, it was confirmed that when a difference $\alpha_{dif}$ of linear expansion coefficients of the core part 221 and the sensor element 100 is $20 \times 10^{-6}/°$ C. or less, $\alpha_{dif} L_{max} \leq 84$ is satisfied and high reliability can be ensured.

On the other hand, from Table 1, also as to a longitudinal elastic modulus, values of the respective materials are largely different. When the longitudinal elastic modulus is small, that is, the rigidity is low, for example, it is likely that a vibration owing to a resonant frequency of the sensor element 100 is propagated to the first joint surface 201 and the substrate body 210 vibrates at a phase different from that of the sensor element 100. Further, when a vibration of the substrate body 210 is propagated to the sensor element 100, the sensor element 100 vibrates differently from intrinsic characteristics. Therefore, the sensitivity of the sensor element 100 is affected.

Now, as a material of the core part 221, a metal material having the longitudinal elastic modulus of, for example, 100 GPa or more can be adopted. Herewith, high rigidity of the core part 221 is ensured, and also an entire wiring substrate 200 including the substrate body 210 can be suppressed from elastically deforming. Therefore, the substrate body 210 is suppressed from vibrating accompanying a resonant vibration of the sensor element 100, and the sensitivity characteristics of the sensor element 100 can be suppressed from varying. As such the material, the 42 alloy has the longitudinal elastic modulus of 195 GPa and can sufficiently exert a function as the core part 221.

Further, when a material of the core part 221 is a metal material such as a 42 alloy, also heat dissipation property of the controller 300 can be ensured.

Values of linear expansion coefficients in the sensor element 100 and a wiring substrate 200 are calculated as follows. Firstly, a linear expansion coefficient α of a solid can be represented by the following formula.

$$\Delta L = \alpha \cdot L \cdot \Delta t \quad (2)$$

In the formula, L represents a length of a material, and $\Delta L$ represents an amount of change in a length of a material when a temperature is changed by $\Delta t(K)$ from $t_1$ (K) to $t_2$(K). Therewith, by measuring lengths in a predetermined direction of the sensor element 100 and a wiring substrate 200 at $t_1$(K) and lengths in the same direction at an optional temperature $t_2$(K), and by using a formula (2), the respective αs are calculated, and values of these linear expansion coefficients can be compared. The linear expansion coefficient (linear expansion rate) of a wiring substrate 200 may well be calculated by measuring amounts of change of lengths of the inside of the core part 221, preferably between a plurality of lands on which the sensor element 100 is mounted.

Further, values of longitudinal elastic moduli in the sensor element 100 and a wiring substrate 200 are calculated as follows. Firstly, a longitudinal elastic modulus E can be represented by the following formula.

$$\Delta L = (\sigma/E) \times L \quad (1)$$

In the formula, L represents a length of a material, α represents stress, and $\Delta L$ represents an amount of distortion when stress is applied on a material. When values of longitudinal elastic moduli E of the sensor element 100 and a wiring substrate 200 are calculated from the formula (1), for example, the following process is taken. That is, for example, one end extending along an X-axis direction of these is fixed, with respect to the other end that faces therewith in a Y-axis direction, predetermined tensile stress is imparted in a Y-axis direction, and lengths along a Y-axis direction before and after that are measured. Since a difference of lengths before and after stress application corresponds to $\Delta L$, by using the formula (1), E of each of the sensor element 100 and a wiring substrate 200 can be calculated and these values can be compared. The longitudinal elastic modulus of a wiring substrate 200 may well be calculated by measuring a difference before and after application of stress of lengths of the inside of the core part 221, preferably lengths between a plurality of lands on which the sensor element 100 is mounted along a Y-axis direction.

[Shield Part]

The shield part 400 is formed by covering the sensor element 100 disposed on the first joint surface 201.

The shield part 400 is formed into a near cuboid cap-like shape. Specifically, the shield part 400 has side surfaces and a top surface and is formed by squeezing a metal plate. A joining position with the first joint surface 201 is not particularly limited. However, by joining at two or more positions, a shield effect described below can be more effectively exerted. Without particularly limiting a joining method as well, other than adhesion with an adhesive, solder joining, and seam welding, fixing by mechanical caulking may be used. On the first joint surface 201 of the substrate body 210, a groove part or a step part for engaging with an end part of the shield part 400 may be formed.

Further, the shield part 400 may be formed of a conductive material having a value of a linear expansion coefficient close to that of the sensor element 100. Specifically, with reference to Table 1, a 42 alloy that is an alloy, or W, Cu can be adopted. Thus, by fitting a value of a linear expansion coefficient thereof with that of the first joint surface 201, stress at a position joining with the first joint surface 201 can be suppressed.

Still further, when a metal material having a longitudinal elastic modulus of, for example, 100 GPa or more is adopted, the rigidity of the first joint surface 201 can be more increased.

Here, since the sensor device 1 is generally mounted on a regulation substrate together with other electronic components, the sensor device 1 may be affected by an electromagnetic wave generated from the other electronic components. Further, since the sensor element 100 has to detect a slight displacement of a vibrator vibrated by a piezoelectric effect, sensor characteristics may be largely disturbed by intrusion of an external electromagnetic wave.

Accordingly, when the shield part 400 including a conductor is disposed to cover the sensor element 100, the sensor element 100 can be shielded from such the external noise. Further, the shield part 400 may be electrically connected to a ground potential via an earth terminal disposed on the first joint surface 201. Herewith, a more stable shield effect can be obtained.

Further, the shield part 400 exerts a light shielding function with respect to the sensor element 100. As will be described below, in order to drive the sensor element 100 and to detect an angular velocity, piezoelectric characteristics of a piezoelectric film is used. However, this kind of piezoelectric film has not only a piezoelectric effect but also a pyroelectric effect. The shield part 400 prevents driving characteristics of the sensor element 100 and detection characteristics of angular velocity from fluctuating owing to a change of polarization characteristics caused by irradiation of ambient light.

Still further, the shield part 400 exerts also a function as a cover of the sensor device 1, and, by covering the sensor element 100, a handling property as an electronic component can be increased.

[Sensor Element]

Hereinafter, a structure and an operation of the sensor element 100 will be described in detail.

Figure 3:
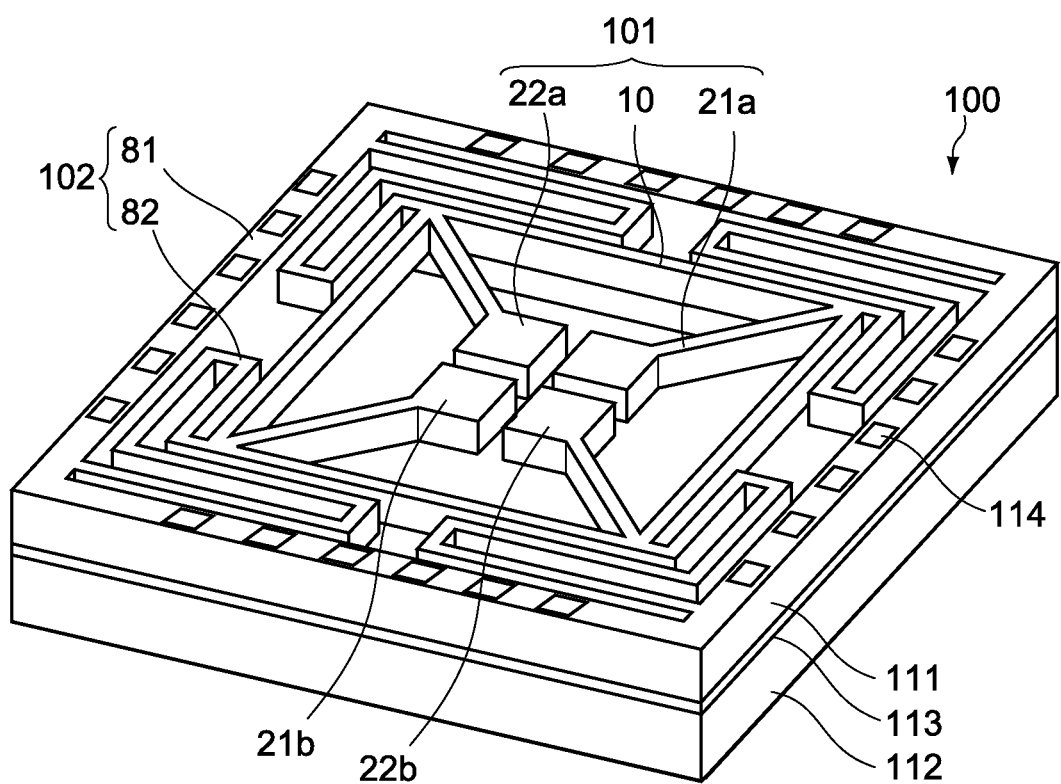
FIG. 3 is an entire perspective view of a sensor element according to a first embodiment of the present technology.
Figure 3:
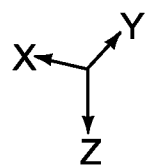
Figure 4:
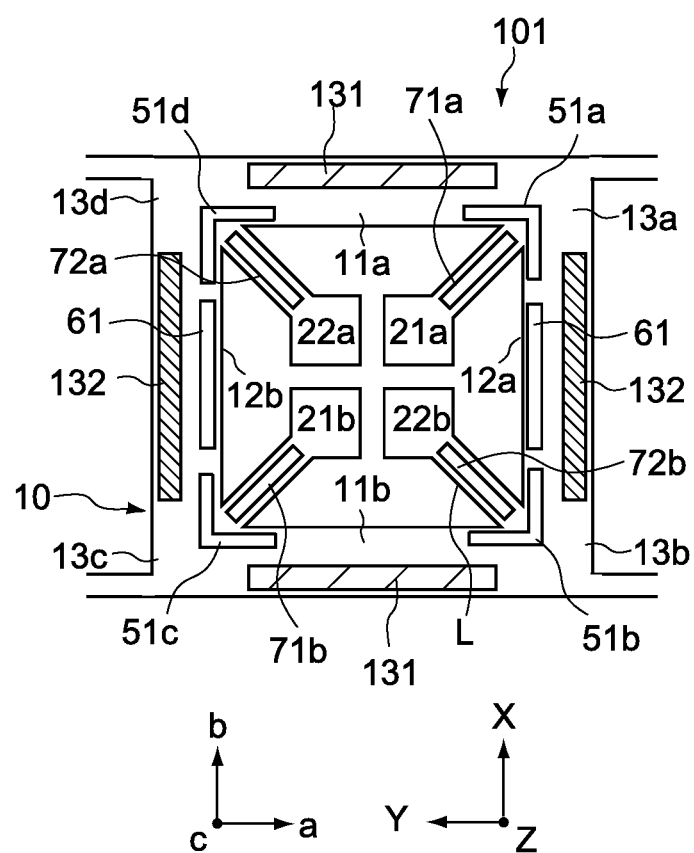
FIG. 4 is a plan view schematically showing a main part of the sensor element.

FIG. 3 is an entire perspective view showing an example of a structure of the sensor element 100, and shows a back surface side of an element that faces a wiring substrate 200. FIG. 4 is a plan view schematically showing a structure of a main part (vibrator part 101) of the sensor element. As was described above, the sensor element 100 has the vibrator part 101 and the frame body 102. The vibrator part 101 has an annular frame 10 that includes a pair of first beams, a pair of second beams and a connection part and has four sides, and pendulum parts 21a, 21b, 22a and 22b, and the frame body 102 has a base part 81 and a coupling part 82.

The frame 10 has a horizontal direction in an a-axis direction, a vertical direction in a b-axis direction and a thickness direction in a c-axis direction. In FIG. 4, in a direction in parallel with the a-axis, a Y-axis is set, and in a direction in parallel with the b-axis, an X-axis is set. A Z-axis direction is an axis direction in parallel with the c-axis direction.

Each of sides of a frame 10 works as a vibrating beam and includes a pair of first beams 11a and 11b, which extend in parallel with each other in the a-axis direction, and a pair of second beams 12a and 12b, which extend in parallel with each other in the b-axis direction orthogonal to the a-axis direction. Each of beams 11a, 11b, 12a and 12b has the same length, width and thickness, and an external appearance of the frame 10 has a hollow square shape.

At positions corresponding to four corners of the frame 10, connection parts 13a, 13b, 13c and 13d that connect between a pair of first beams 11a an 11b and a pair of second beams 12a and 12b are respectively formed. Both ends of the pair of first beams 11a and 11b and the pair of second beams 12a and 12b are supported respectively by the connection parts 13a to 13d.

The frame 10 further has first pendulum parts 21a and 21b, and second pendulum parts 22a and 22b. The first pendulum parts 21a and 21b respectively are formed on a pair of the connection parts 13a and 13c, which are mutually in a diagonal relationship and extend inward of the frame 10 along its diagonal line direction. The second pendulum parts 22a and 22b respectively are formed on the other pair of connection parts 13b and 13d, which are mutually in a diagonal relationship and extend inward of the frame 10 along its diagonal line direction. One end of each of the first and second pendulum parts 21a, 21b, 22a, and 22b is fixed to the connection parts 13a to 13d, and the other end of each thereof is set free and works as an oscillating weight disposed in the neighborhood of the frame 10. Further, a part between one end fixed to each of the connection parts 13a to 13d and the other end is taken as an arm part L.

The sensor element 100 has, as a drive part that vibrates the frame 10, first driving electrodes 131 respectively disposed along the pair of first beams 11a and 11b on top surfaces thereof, and second driving electrodes 132 respectively disposed along the pair of second beams 12a and 12b on top surfaces thereof. The driving electrodes 131 and 132 mechanically deform corresponding to an input voltage, and a driving force of the deformation vibrates the beams 11a, 11b, 12a and 12b. A direction of deformation is regulated by a polarity of an input voltage. In FIG. 4, for the purpose of easy understanding, each of the driving electrodes 131 and 132 is shown with a different kind of hatching.

The driving electrodes 131 and 132 each has the same structure, and, though omitted from showing in the drawing, has a laminate structure of upper and lower electrode layers and a layer of piezoelectric material formed between these electrode layers. The layer of piezoelectric material is formed from, for example, lead titanate zirconate (PZT) and polarized and oriented to expand and shrink corresponding to a potential difference between the upper electrode layer and the lower electrode layer. Therefore, when a lower electrode layer of each of the driving electrodes 131 and 132 is connected to a common reference potential to apply an AC current to the upper electrode layer of each thereof, a piezoelectric material layer can be expanded and shrunk.

Here, an operation principle of the sensor element 100 will be described.

On a first driving electrode 131 and a second driving electrode 132, voltages of mutually opposite phases are applied to expand one and shrink the other. Herewith, beams 11a and 11b and beams 12a and 12b are flexurally deformed in b-axis and a-axis directions with both ends thereof supported by the connection parts 13a to 13d and vibrate in the X-Y plane alternately between a direction where both separate from each other and a direction where both come near with each other.

Therefore, in the case where a pair of first beams 11a and 11b vibrates in a direction where these mutually come near, a pair of second beams 12a and 12b vibrate in a direction where the beams separate from each other, and in the case where a pair of first beams 11a and 11b vibrates in a direction where these separate from each other, a pair of second beams 12a and 12b vibrates in a direction where these come near with each other. At this time, a center part of each of the beams 11a, 11b, 12a, and 12b forms an antinode of vibration, and both end parts thereof (the connection parts 13a to 13d) form nodes of vibration. Such the vibration mode will be referred to, hereinafter, as a fundamental vibration of the frame 10.

Each of the beams 11a, 11b, 12a, and 12b is driven at a resonant frequency thereof. A resonant frequency of each of beams 11a, 11b, 12a, and 12b is determined by a shape and a length thereof. For example, in the present embodiment, a resonant frequency of each of beams 11a, 11b, 12a, and 12b is set in the range of 1 to 100 kHz.

Figure 5:
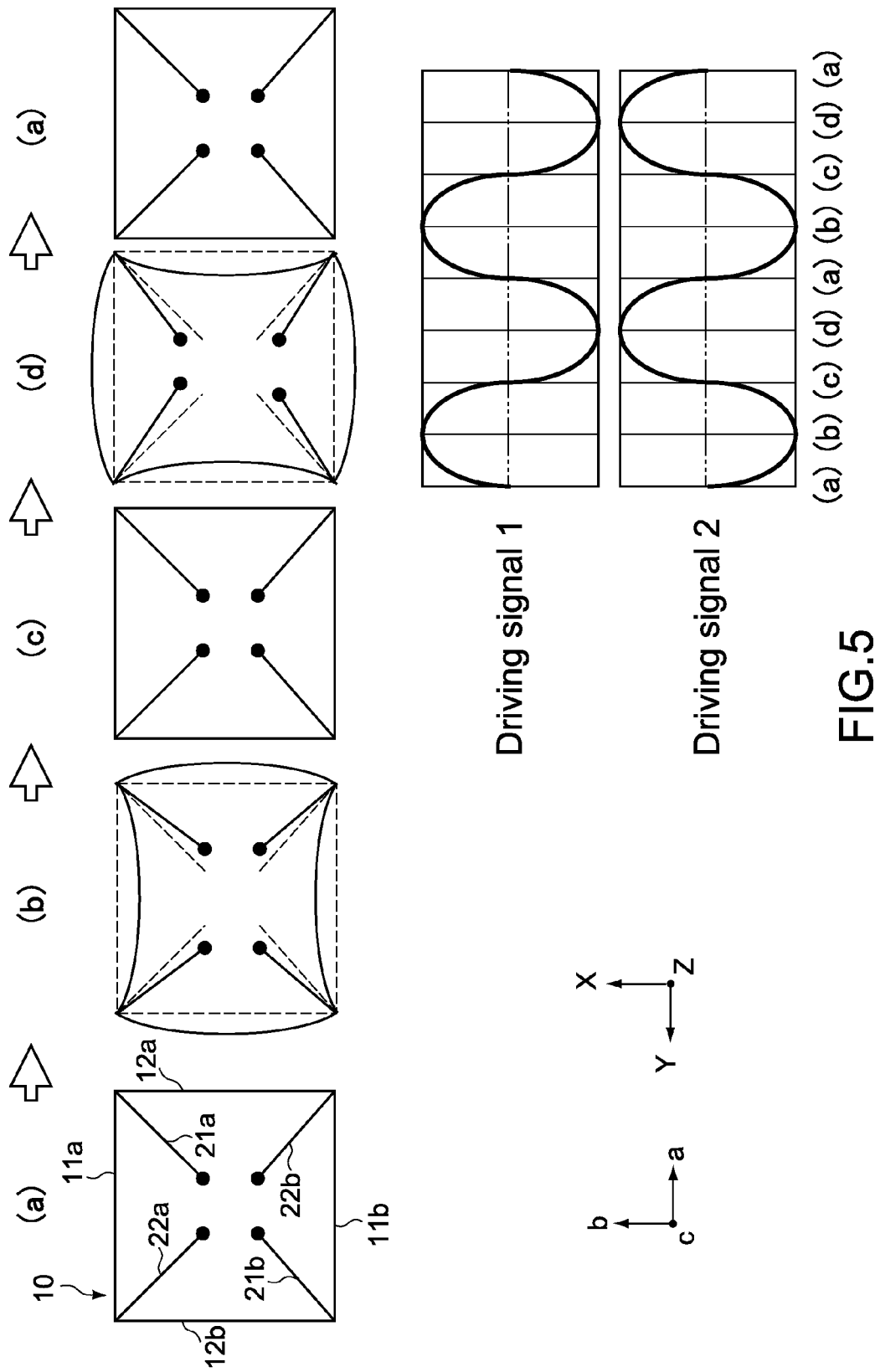
FIG. 5 is a diagram for explaining a vibration mode of the sensor element.

FIG. 5 is a schematic diagram showing a temporal change of a fundamental vibration of the frame 10. In FIG. 5, "a driving signal 1" shows a temporal change of an input voltage that is input to a first driving electrode 131, and "a driving signal 2" shows a temporal change of an input voltage that is input to a second driving electrode 132. As shown in FIG. 5, each of the driving signal 1 and driving signal 2 has an AC wave shape changing in an opposite phase from each other. Herewith, the frame 10 changes in an order of (a), (b), (c), (d), (a), . . . , and, in a vibration mode where when one pair of the first pair of beams 11a and 11b and the second pair of 12a and 12b comes near, the other pair separates, and when one pair separates, the other pair comes near, the frame 10 vibrates.

In actuality, during from an application of input signal to a change (displacement) of the frame, there is a retardation time under the influence of a response time and an input operation frequency of a piezoelectric material, and a frame resonant frequency. In the present embodiment, by assuming that the retardation time is sufficiently small, the temporal change of FIG. 5 is described.

Further, accompanying the fundamental vibration of the frame 10, also first pendulum parts 21a and 21b and second pendulum parts 22a and 22b synchronize with a vibration of the frame 10 and vibrate respectively in the X-Y plane with the connection parts 13a to 13d as a center. Vibrations of pendulum parts 21a, 21b, 22a, and 22b are excited by vibrations of the beams 11a, 11b, 12a, and 12b. In this case, the first pendulum parts 21a and 21b and second pendulum parts 22a and 22b vibrate (fluctuate) in an opposite phase from each other in a left and right fluctuation direction from a fulcrum part of a pendulum part in the X-Y plane, that is, the connection parts 13a to 13d.

As shown in FIG. 5, when the pair of first beams 11a and 11b vibrates in a direction where these mutually come near, the first pendulum part 21a and the second pendulum part 22a vibrate in a direction where these separate from each other (state (b)), and, when the pair of first beams 11a and 11b vibrates in a direction where these separate from each other, the first pendulum part 21a and the second pendulum part 22a vibrate in a direction where these mutually come near (state (d)). Also the first pendulum part 21b and the second pendulum part 22b vibrate alternately between a direction where these separate from each other and a direction where these come near with each other depending on a vibration direction of the pair of second beams 12a and 12b. As was described above, the first pendulum parts 21a and 21b and the second pendulum parts 22a and 22b vibrate in an opposite phase from each other in synchronizing with a fundamental vibration of the frame 10.

As was described above, when AC voltages of opposite phases are applied to driving electrodes 131 and 132, each of beams 11a, 11b, 12a, and 12b of the frame 10 vibrates in a vibration mode shown in FIG. 5. When an angular velocity about a Z-axis is applied to the frame 10 that continues such the fundamental vibration, since a Coriolis force due to the angular velocity is operated at the respective points of the frame 10, the frame 10 is strained and deformed in the X-Y plane as was shown in FIG. 6. Therefore, when an amount of deformation of the frame 10 in the X-Y plane is detected, a magnitude and a direction of an angular velocity operated on the frame 10 can be detected.

Figure 6:
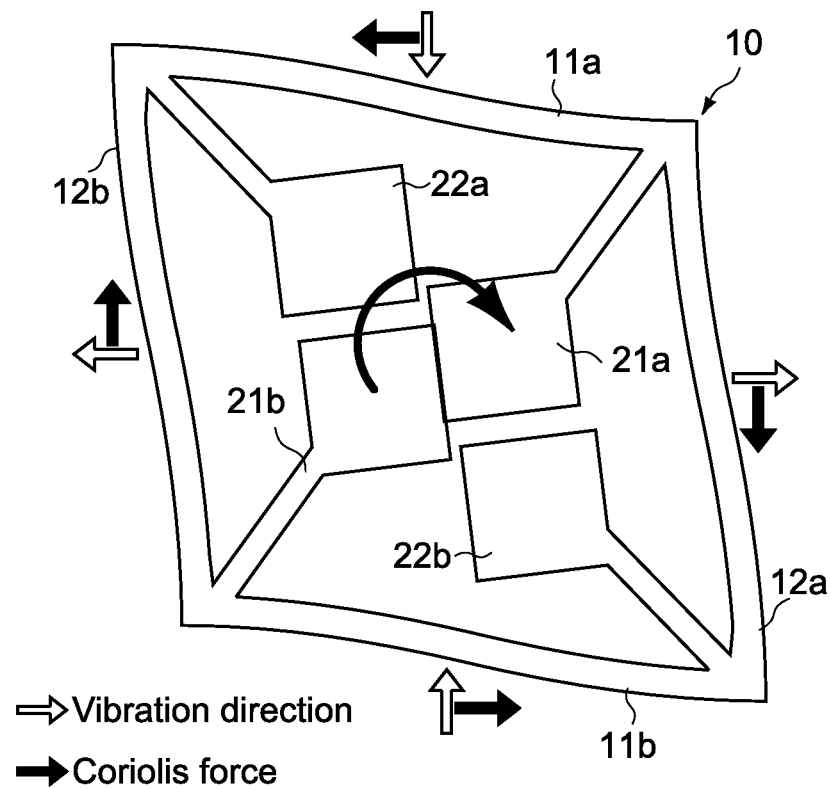
FIG. 6 is a diagram for explaining an operation of the sensor element.

FIG. 6 is a plan view schematically showing a situation of deformation of the frame 10 at an instant of the frame 10 on which an angular velocity about a Z-axis is operated. For the purpose of easy understanding, a shape and a situation of deformation of the frame 10 are shown by slightly exaggerating. When an angular velocity in a clockwise direction with a Z-axis as a center is operated on the frame 10 that vibrates at a fundamental frequency, at the respective points (beams 11a, 11b, 12a, and 12b, pendulum parts 21a, 21b, 22a, and 22b) of the frame 10, in the X-Y plane that is orthogonal to a Z-axis, in a direction of 90° in a clockwise direction from a direction of movement (direction of vibration) at the instant of the respective points, a Coriolis force proportional to a magnitude of the angular velocity is generated. That is, a direction of a Coriolis force is, as shown in FIG. 6, determined by a direction of a vibration at the instant of a point on which a Coriolis force operates. Herewith, the frame 10 is distorted (squashed) into a near parallelogram shape from a square shape in the X-Y plane.

FIG. 6 shows a situation when a predetermined angular velocity operates clockwise with a Z-axis as a center. In the case where a direction of an angular velocity is opposite (anticlockwise), also a direction of a Coriolis force that works on each of points becomes opposite.

Any method may be used to measure an angular velocity operated on the frame 10. In the present embodiment, a piezoelectric type detection layer formed on the frame 10 is used to measure the angular velocity. The sensor element 100 has, as shown in FIG. 4, four detecting electrodes 51 as a piezoelectric type detection layer that detects an angular velocity about a Z-axis.

Each of detecting electrodes 51a, 51b, 51c, and 51d is formed respectively on the periphery of each of the connection parts 13a to 13d. Each of the detecting electrodes 51a to 51d extends in two directions along the beams from connection parts 13a to 13d. The detecting electrode 51 has a structure the same as those of the driving electrodes 131 and 132, includes a laminate body of a lower electrode layer, a piezoelectric material layer and an upper electrode layer, and has a function of converting a mechanical deformation of each of the beams into an electrical signal.

On the other hand, as the piezoelectric-type detecting layers that detect angular velocity about an X-axis and about a Y-axis, the sensor element 100 of the present embodiment has detecting electrodes 71a, 71b, 72a, and 72b respectively formed on the pendulum parts 21a, 21b, 22a and 22b.

Each of the detecting electrodes 71a, 71b, 72a and 72b is linearly formed on a shaft center of an arm part L of each of pendulum parts 21a, 21b, 22a and 22b. Each of the detecting electrodes 71a, 71b, 72a, and 72b has a structure the same as those of the first and second driving electrodes 131 and 132, includes a laminate body of a lower electrode layer, a piezoelectric material layer and an upper electrode layer, and has a function of converting a mechanical deformation of an arm part L into an electrical signal. In particular, each of the detecting electrodes 71a, 71b, 72a and 72b has a function of detecting a deformation in a Z-axis direction of an arm part L.

In the present embodiment, one angular velocity detecting axis (Y-axis) is set on an axis direction in parallel with an a-axis, and the other angular velocity detecting axis (X-axis) is set on an axis direction in parallel with a b-axis. In such the structure, each of the detecting electrodes 71a, 71b, 72a, and 72b formed on the pendulum parts 21a, 21b, 22a and 22b functions as a detection part for detecting an angular velocity about an X-axis and an angular velocity about a Y-axis.

Figure 7A:
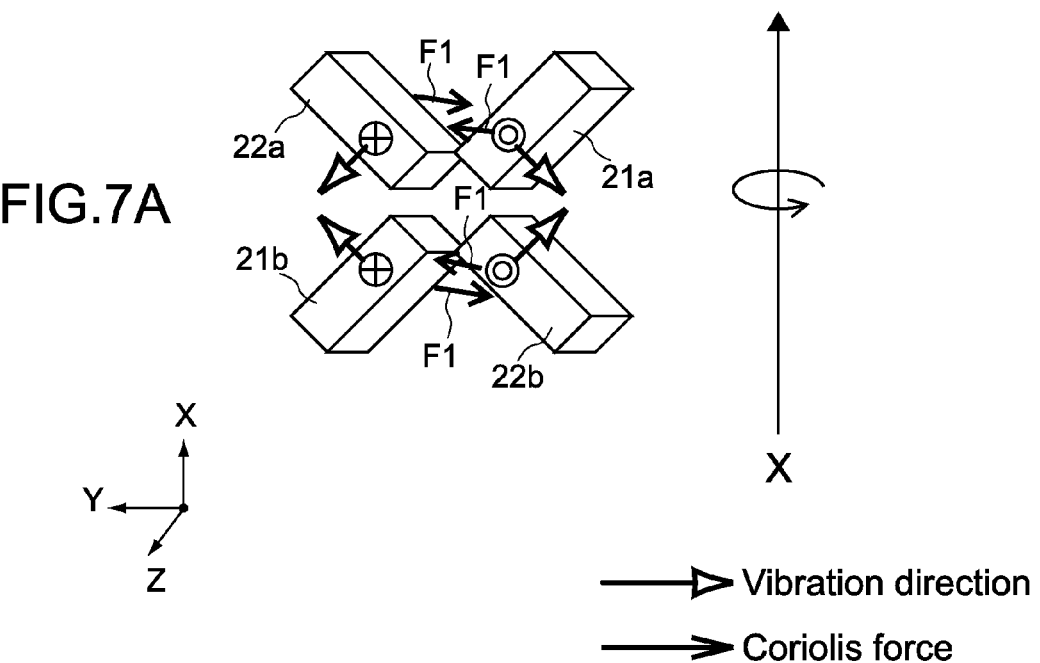
FIGS. 7A and 7B each is a diagram for explaining another operation of the sensor element.

On the driving electrodes 131 and 132, AC voltages having a mutually opposite phase are input respectively. Herewith, each of the beams 11a, 11b, 12a and 12b and the pendulum parts 21a, 21b, 22a and 22b of the frame 10 vibrates at a vibration mode (fundamental vibration) shown in FIG. 5. FIG. 7A is a schematic perspective view for describing vibration modes of the pendulum parts 21a, 21b, 22a and 22b when an angular velocity about an X-axis is applied to the frame 10. On the other hand, FIG. 7B is a schematic perspective view for describing vibration modes of the pendulum parts 21a, 21b, 22a and 22b when an angular velocity about a Y-axis is applied to the frame 10.

When an angular velocity about an X-axis operates on the frame 10 that vibrates at a fundamental vibration, as shown in FIG. 7A, in each of the pendulum parts 21a, 21b, 22a and 22b, a Coriolis force F1 is generated in a direction orthogonal with a direction of vibration at this instant. Herewith, one pair of a pendulum part 21a and a pendulum part 22b that are adjacent in an X-axis direction is deformed in a positive direction of a Z-axis owing to a Coriolis force F1, and amounts of deformation thereof are detected respectively by detecting electrodes 71a and 72b. Further, the other pair of pendulum parts 22a and 21b that are adjacent in an X-axis direction is deformed in a negative direction of a Z-axis owing to a Coriolis force F1, and amounts of deformation thereof are detected respectively by detecting electrodes 72a and 71b.

Figure 7B:
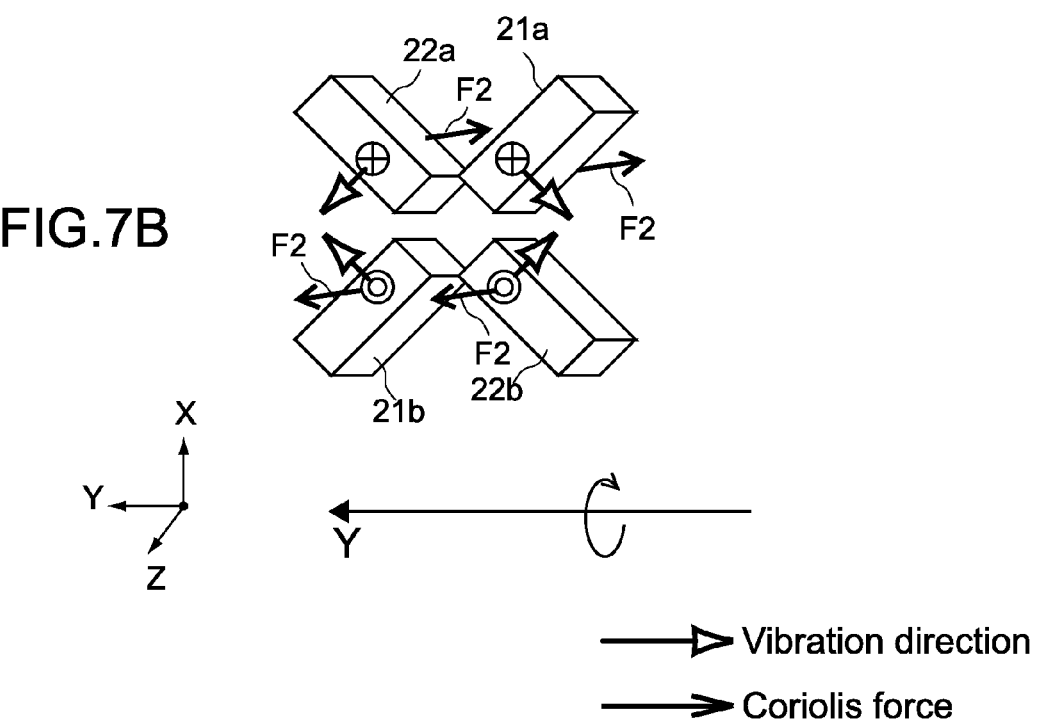

On the other hand, when an angular velocity about a Y-axis operates on the frame 10 that vibrates at a fundamental vibration, as shown in FIG. 7B, in each of the pendulum parts 21a, 21b, 22a and 22b, a Coriolis force F2 is generated in a direction orthogonal with a direction of vibration at this instant. Herewith, one pair of a pendulum part 21a and a pendulum part 22a that are adjacent in a Y-axis direction is deformed in a negative direction of a Z-axis owing to a Coriolis force F2, and amounts of deformation thereof are detected respectively by detecting electrodes 71a and 72a. Further, the other pair of pendulum parts 21b and 22b that are adjacent in a Y-axis direction is deformed in a positive direction of a Z-axis owing to a Coriolis force F2, and amounts of deformation thereof are detected respectively by detecting electrodes 71b and 72b.

Also when an angular velocity is generated about an axis in a direction that obliquely intersects with an X axis and a Y axis respectively, according to the principle the same as that described above, an angular velocity can be detected. That is, each of the pendulum parts 21a, 21b, 22a and 22b is deformed by a Coriolis force corresponding to a X-direction component and a Y-direction component of the angular velocity and amounts of deformation thereof are detected respectively by the detecting electrodes 71a, 71b, 72a and 72b. A driver of a sensor element respectively extracts, based on outputs of these detecting electrodes, an angular velocity about an X-axis and an angular velocity about a Y-axis. Herewith, an angular velocity about an optional axis in parallel with the X-Y plane can be detected.

[Controller]

Next, the controller 300 will be described.

The controller 300 is used, as was described above, as a controller of the sensor element 100. The controller 300 has a plurality of terminal parts 310 electrically connected with each of electrodes of the sensor element 100. The terminal part 310 is, as was described above, directly connected with a land of the lower wiring layer 232 and electrically connected with the sensor element 100 via a via formed inside of the substrate body 210.

The controller 300 has a self-excited oscillation circuit, a detector circuit, and a smoothing circuit. The self-excited oscillation circuit is connected to driving electrodes 131 and 132 and generates driving signals (AC signal) for driving these. Further, when on a side of a terminal connected to one of the driving electrodes 131 and 132, an inverting amplifier is disposed, the driving electrodes 131 and 132 can be expanded and shrunk respectively in opposite phases. Further, the controller 300 may have a terminal connected to a reference potential.

Further, each of the detecting electrodes 51a to 51d, 71a, 71b, 72a and 72b is connected to an arithmetic circuit to detect an electric signal according to a deformation of each of detecting electrodes. Each of the arithmetic circuit is disposed to generate an angular velocity signal about an X-axis, a Y-axis or a Z-axis, and, when a predetermined arithmetic operation (operation such as differencing operation) is performed with respect to electric signals outputted from the detecting electrodes 51a to 51d, 71a, 71b, 72a and 72b, a new arithmetic signal containing a signal concerning an angular velocity is generated.

Next, these arithmetic signals are outputted to a detector circuit. The detector circuit full-wave rectifies these arithmetic signals synchronized with an output of driving signal from the self-excited oscillation circuit to convert into a direct current. Further, a signal converted into the direct current is outputted to a smoothing circuit to smooth. In thus acquired DC voltage signals, magnitudes and directions of angular velocities about an X-axis, a Y-axis and a Z-axis are contained. These DC voltage signals can be outputted from the terminal part 310 of the controller 300 via the lower wiring layer 232 and the external connection terminal 232a to other regulation substrate.

In thus formed sensor device 1, the controller 300 embedded in the substrate body 210 and the sensor element 100 are disposed to face in a Z-axis direction. Herewith, there is no need of mounting the sensor element 100 and the controller 300 on the same plane, and a device structure can be more miniaturized.

Now, in the case where the substrate body 210 is formed of a ceramic substrate, for example, it is not practical from the view point of cost to take a structure where a component is incorporated. Therefore, when the sensor element 100 and the controller 300 are mounted by superposing (that is, laminating) mounting areas thereof, it is necessary to form, in the substrate body 210, a recess part for housing either one of the sensor element 100 and the controller 300. For example, in the case where the controller 300 is disposed on a recess part, since the sensor element 100 has to be disposed on the recess part and a size of the sensor element 100 has to be formed larger than those of the controller 300 and the recess part, it is difficult to correspond to miniaturization.

On the other hand, in the case where the sensor element 100 is housed in the recess part, it is difficult to conduct laser trimming after mounting. That is, in the case where the sensor element 100 is formed from a gyrosensor, in order to correct vibration characteristics caused by shape asymmetry of a vibrator, in some cases, after mounting, a shape is adjusted by laser processing while confirming an output signal. In this case, when the sensor element 100 is housed in the recess part, since a circumference of the sensor element 100 is covered with the substrate body 210 and the controller 300, it is difficult to irradiate laser onto the sensor element 100.

In the sensor device 1 according to the present embodiment, because as a material that forms the substrate body 210 an organic resin material such as an epoxy resin is selected, the controller 300 can be readily embedded. Herewith, a nearly flat first joint surface 201 can be ensured on the substrate body 210, and a degree of freedom of a size of the sensor element 100 mounted thereon can be increased. Therefore, the sensor element 100 can be miniaturized and the number of sensor elements obtained from 1 wafer during manufacture can be increased to contribute also to reduce the cost.

Further, irrespective of magnitude relationship with the controller 300, the sensor element 100 can be typically disposed on the first joint surface 201. Thus, a structure that allows to conduct laser trimming after mounting can be obtained.

Further, thus formed sensor device 1 has the regulation part 220 containing the core part 221 configured of a 42 alloy. Herewith, a linear expansion coefficient in a plane direction of the substrate body 210 containing an epoxy resin can be approximated to a linear expansion coefficient of the sensor element 100. Therefore, inconveniences such as characteristics change of the sensor element 100 and breakdown of a joint part, which are caused by thermal expansion can be suppressed.

Also the longitudinal elastic modulus in a plane direction of the substrate body 210 including an epoxy resin can be approximated to a longitudinal elastic modulus of the sensor element 100. Herewith, the rigidity of the substrate body 210 can be increased, and the first joint surface 201 can be suppressed from elastically deforming accompanying a vibration of the sensor element 100. Therefore, a resonant frequency of the sensor element 100 can be stabilized and desired vibration characteristics of the sensor element 100 can be maintained.

<Second Embodiment>

Figure 8:
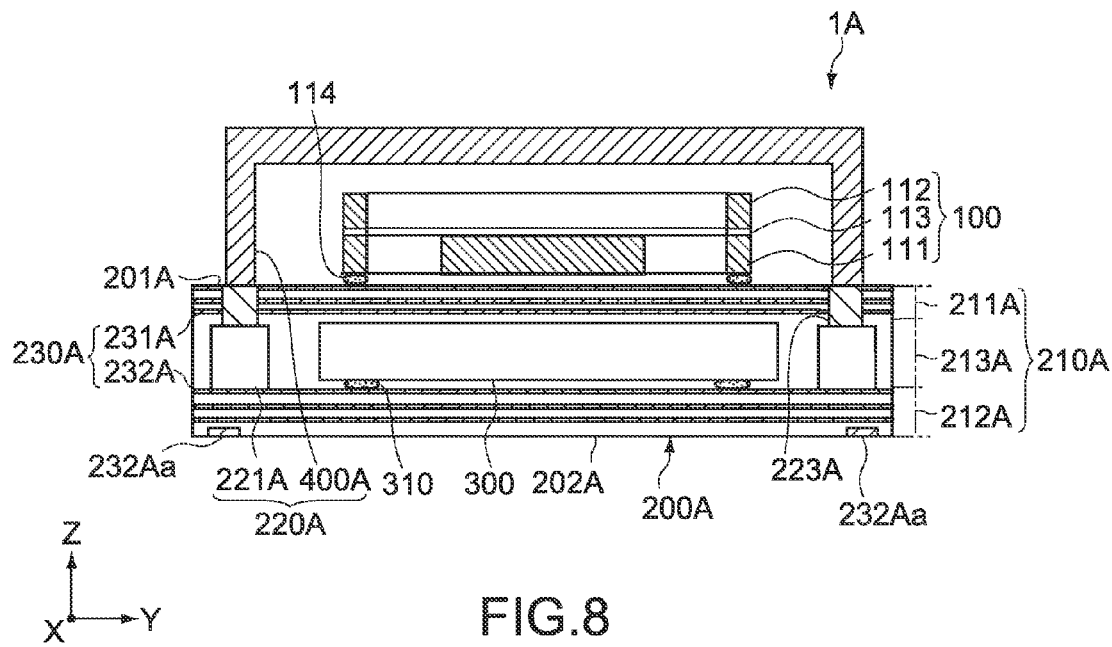
FIG. 8 is a schematic sectional view of a sensor device according to a second embodiment of the present technology.
Figure 9:
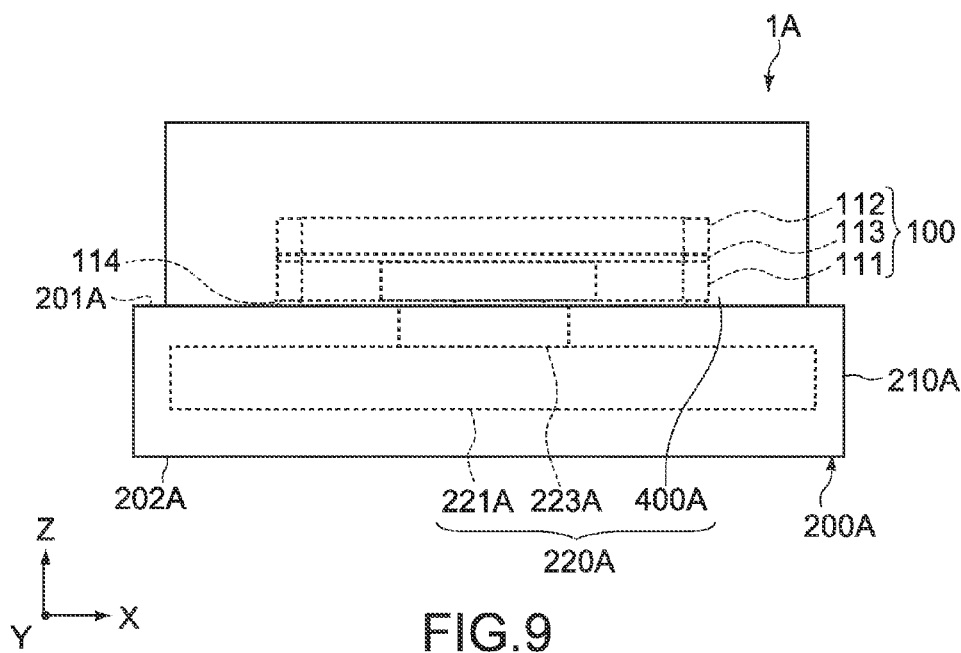
FIG. 9 is a schematic sectional view of a sensor device according to a second embodiment of the present technology.

FIGS. 8 and 9 are diagrams showing a structure of a sensor device according to a second embodiment of the present technology, FIG. 8 is a schematic sectional view, and FIG. 9 is a schematic side view seen from a Y-axis direction. In the drawings, like members corresponding to those of the first embodiment have the like numbers, and detailed description thereof will be omitted.

A sensor device 1A according to the present embodiment is different from the first embodiment in that a core part 221A of a regulation part 220A and a shield part 400A are joined by a joint part (first joint part) 223A. Since other members have structures the same as those of the sensor device 1 according to first embodiment, a structure of the regulation part 220A will be mainly described.

The regulation part 220A according to the present embodiment has, in addition to the core part 221A having a structure the same as that of the first embodiment, a joint part 223A. The joint part 223A joins the core part 221A and a shield part 400A and is embedded in the substrate body 210. The joint part 223A according to the present embodiment is disposed at two positions that face in a Y-axis direction. However, the number thereof to be disposed is not particularly limited.

The joint part 223A is formed of a columnar body obtained by filling a metal in a hole formed inside of the substrate body 210A. The joint part 223A is formed in such a manner that one end thereof is joined with the core part 221A, and the other end thereof protrudes from a first joint surface 201A to come into contact with the shield part 400A. A material that constitutes the joint part 223A is not particularly limited. However, for example, Cu can be adopted.

As a process for forming the joint part 223A, for example, the following first to third processes are adopted.

According to the first process, with respect to the first joint surface 201A of the substrate body 210A, by irradiating laser, a hole is formed in a region for forming the joint part 223A. The hole is formed on the core part 221A so that the core part 221A is exposed from a bottom part. Then, a post (columnar body) of metal such as Cu is buried in the hole. An end surface of the metal post may well be formed to be the same plane with the first joint surface 201A, and when the end surface protrudes, a height may be adjusted by polishing.

As the second process, a process where a hole is formed on the core part 221A in a manner the same as that of the first method, and, in the hole, plating is grown can be cited. At this time, the core part 221A can be handled as a seed, or a seed layer may be separately formed at a bottom part of the hole. Also according to the process, the joint part 223A having the above structure can be formed.

Further, as the third process, in a manner the same as that of the first process, by forming a hole on the core part 221A, and by filling a conductive paste in the hole, the joint part 223A may be formed.

Further, in any one of the first to third processes, by coating a joining material of a conductive paste on an end surface of the columnar body that forms the joint part 223A and by bringing into contact with the shield part 400A, the joint part 223A and the shield part 400A can be electrically joined.

On the other hand, the core part 221A is formed from a material that has a value of a linear expansion coefficient close to that of the sensor element 100 such as a 42 alloy. Further, a material having the longitudinal elastic modulus of, for example, 100 GPa or more and high rigidity can be adopted.

Also the shield part 400A is formed from a material having a value of the linear expansion coefficient close to that of the sensor element 100. Specifically, a 42 alloy that is an alloy, W and Cu can be adopted, and these materials can sufficiently ensure the rigidity as well.

When the joint part 223A is formed from a conductor and the core part 221A is formed from a conductor such as a 42 alloy or Cu, electrical conduction can be ensured between these and the shield parts 400A. Herewith, the shield part 400A, the joint part 223A and the core part 221A as a whole form a large electromagnetic shield and can shield an external intrusion of an electromagnetic wave. Therefore, also with respect to an upper wiring layer 231A and the controller 300, of which circumference is covered with the joint part 223A and the core part 221A, a shield effect can be exerted and operational reliability as the sensor device 1 as a whole can be more increased. Further, when at least any one of the joint part 223A, the core part 221A and the shield part 400A is connected to a grounding circuit, a more stable shield effect can be exerted.

Still further, when the shield part 400A and the core part 221A are joined with the joint part 223A, thermal expansion in a first region 211A of the substrate body 230A can be suppressed, thus stress between the first joint surface 201A and the terminal part 114 can be suppressed. Further, since the rigidity of the first region 211A is increased, desired sensor characteristics of the sensor element 100 can be stably maintained.

<Third Embodiment>

Figure 10:
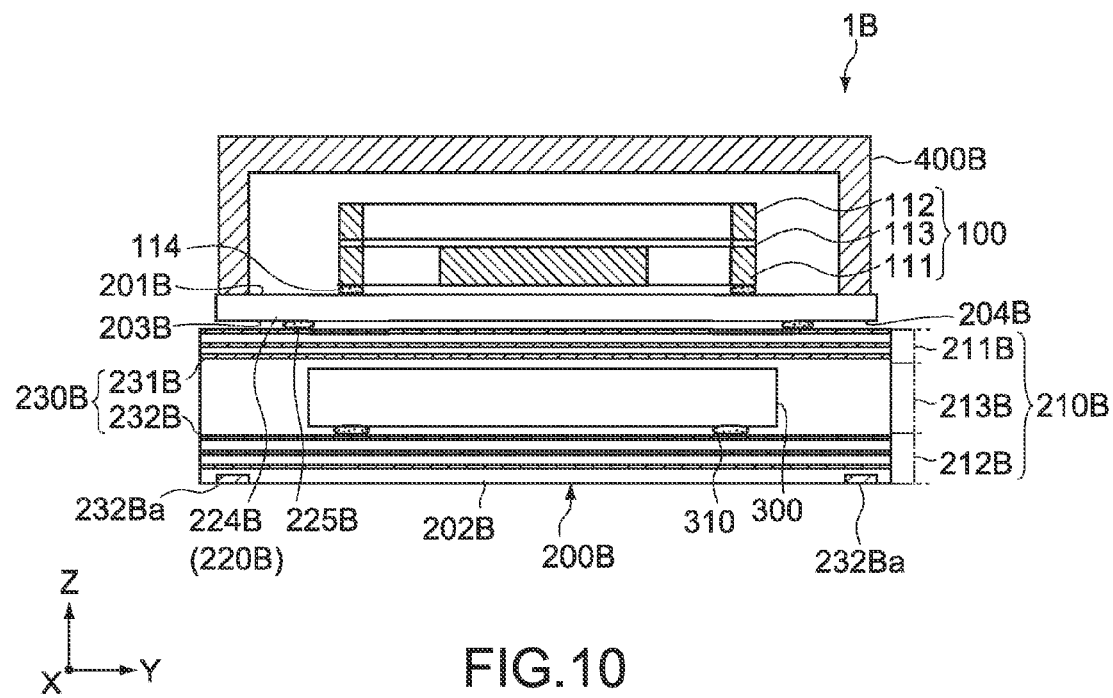
FIG. 10 is a schematic sectional view of a sensor device according to a third embodiment of the present technology.

FIG. 10 is a schematic sectional view of a sensor device according to a third embodiment of the present technology. In the drawing, like members corresponding to those of the first embodiment have the like numbers, and a detailed description thereof will be omitted.

A sensor device 1B according to the present embodiment has a structure of a regulation part 220B in a wiring substrate 200B different from that of the first embodiment. That is, the regulation part 220B according to the present embodiment includes, in place of a core part, a base material 224B of an inorganic insulating material. The base material 224B is disposed between the sensor element 100 and a substrate body 210B, and is laminated with the substrate body 210B.

The base material 224B includes a multilayered wiring substrate made of an inorganic insulating material such as ceramics, Si, or MgO. Here, when referencing to Table 1, a linear expansion coefficient of ceramics is $7.0 \times 10^{-6}/°C$. That is, the base material 224B is formed of a material having a linear expansion coefficient close to that of the sensor element 100.

On a surface of the base material 224B, a first joint surface 201B and a third joint surface 203B, which face with each other in a thickness direction are formed. On each of the first and third joint surfaces 201B and 203B, a surface wiring is formed. The first joint surface 201B forms a top surface in a manner the same as that of the first embodiment and is electrically joined with the sensor element 100. The third joint surface 203B forms a bottom surface and is disposed on a side opposite to the substrate body 210B. Between the first joint surface 201B and the third joint surface 203B, vias are formed (omitted from illustrating) and electrical connections with the respective wiring layers are ensured. The base material 224B may be, without limiting to a multilayered wiring substrate, a double-sided substrate, for example.

On the first joint surface 201B, in a manner the same as that of the first embodiment, for example, a surface wiring containing a plurality of land parts for electrically connecting with terminal parts 114 of the sensor element 100 is formed. These surface wirings form a part of a wiring layer (omitted from illustrating) disposed on the base material 224B.

Further, in a manner the same as that of first embodiment, in a region that faces the vibrator part 101 of the sensor element 100 of the first joint surface 201B, a recess part may be formed. Herewith, without disturbing strain deformation owing to a resonant vibration or a Coriolis force of the sensor element 100, the sensor element 100 can be stably supported.

On the other hand, on the third joint surface 203B, a terminal part 225B for electrically connecting with the substrate body 210B may be formed. The terminal part 225B includes, for example, an electrode pad and a solder bump formed thereon, and forms a part of a surface wiring of the base material 224B. The base material 224B is mounted on the substrate body 210B via the terminal part 225B by a flip-chip process.

A shield part 400B is, in the present embodiment, disposed on the base material 224B and formed by covering the sensor element 100. A rough structure of the shield part 400B has, in a manner the same as that of the first embodiment, side surfaces and a top surface, and is formed squeezing a metal plate. Also as a joining method with the first joint surface 201B, in a manner the same as that of the first embodiment, other than adhesion with an adhesive, mechanical caulking, or engagement with a groove part or a step part can be used.

Further, the shield part 400B may be formed from a material having a value of a linear expansion coefficient close to that of the sensor element 100. Specifically, a 42 alloy that is an alloy, or W or Cu can be adopted. Herewith, by nearly matching a linear expansion coefficient with that of a ceramic first joint surface 201, stress in a joint region with the first joint surface 201 can be suppressed. Further, owing to a shielding function and a light shielding function of the shield part 400B, characteristics change of the sensor element 100 can be suppressed.

A rough structure of the substrate body 210B is the same as that of the first embodiment. That is, the substrate body 210B is a multilayered wiring substrate of an epoxy resin, inside of which the controller 300 is embedded. On the other hand, the second embodiment is different from the first embodiment in that the core part is not embedded, and a fourth joint surface 204B that is electrically connected with the third joint surface 203B of the base material 224B is included.

The fourth joint surface 204B is disposed to face the third joint surface 203B and a land part electrically connected with a terminal part 225B of the base material 224B is disposed. The land part forms, in a manner the same as that of the first embodiment, a part of a wiring layer 230B of the substrate body 210B. On the other hand, a second joint surface 202B has a structure the same as that of the first embodiment. That is, an external connection terminal 232Ba connected with a not-shown regulation substrate is formed.

In the present embodiment, the base material 224B that is a multilayered substrate and the substrate body 210B are electrically joined by a flip-chip process and have a laminated structure. Herewith, the respective wiring layers of the base material 224B and the substrate body 210B are electrically connected via a plurality of joint parts 225B and appropriately disposed vias, and can function as one multi-layered wiring substrate.

Further, the regulation part 220B according to the present embodiment has the base material 224B formed from a material having a longitudinal elastic modulus and a linear expansion coefficient close to those of the sensor element 100. Herewith, a first joint surface 201B on the base material 224B can suppress deformation with respect to the sensor element 100. Therefore, strain stress in a plane (XY plane) direction of the sensor element 100 can be suppressed from occurring, and characteristics change owing to a change of a resonant frequency can be suppressed. Further, a vibration of the base material 224B accompanying a resonant vibration of the sensor element 100 is suppressed, and the vibration characteristics of the sensor element 100 can be maintained.

<Fourth Embodiment>

Figure 11:
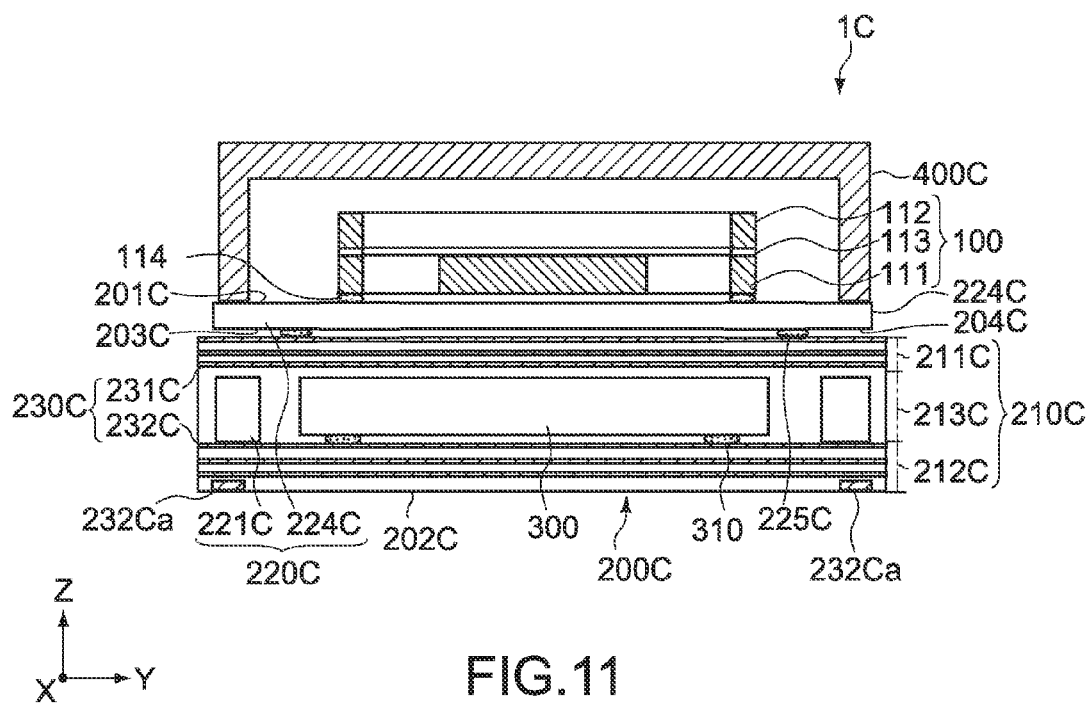
FIG. 11 is a schematic sectional view of a sensor device according to a fourth embodiment of the present technology.

FIG. 11 is a schematic sectional view of a sensor device according to a fourth embodiment of the present technology. In the drawing, like members corresponding to those of the third embodiment have like numbers, and detailed description thereof will be omitted.

A rough structure of a sensor device 1C according to the present embodiment is the same as that of the sensor device 1B according to the third embodiment. A different point is that the regulation part 220C has the base material 224C and a core part 221C.

The core part 221C has a structure the same as that of the core part 221C according to the first embodiment. That is, the core part 221C is embedded in a third region 213C of a substrate body 210C and is annually disposed around the controller 300. Further, as a material of the core part 221C, for example, a 42 alloy is adopted. Herewith, the core part 221C can be formed at a value of a linear expansion coefficient close to that of the sensor element 100.

Owing to the core part 221C, not only the base material 224C but also the substrate body 210C can be set to a value of a linear expansion coefficient close to that of the sensor element 100. Herewith, thermal expansion in a plane direction of the substrate body 210C is suppressed, and inconvenience such as breakdown in the first joint surface 201C can be suppressed.

Further, in the case where a 42 alloy is adopted as a material of the core part 221C, since a longitudinal elastic modulus thereof is 100 GPa or more, the rigidity of the substrate body 210C as a whole can be increased. Therefore, a sensitivity change accompanying a resonant frequency change of the sensor element 100 can be suppressed.

Further, owing to the substrate body 210C, even after a sensor device 1C have been mounted on a regulation substrate, stress such as strain stress at a joint region with the regulation substrate of the substrate body 210C can be suppressed, and, thereby inconveniences can be suppressed.

<Fifth Embodiment>

Figure 12:
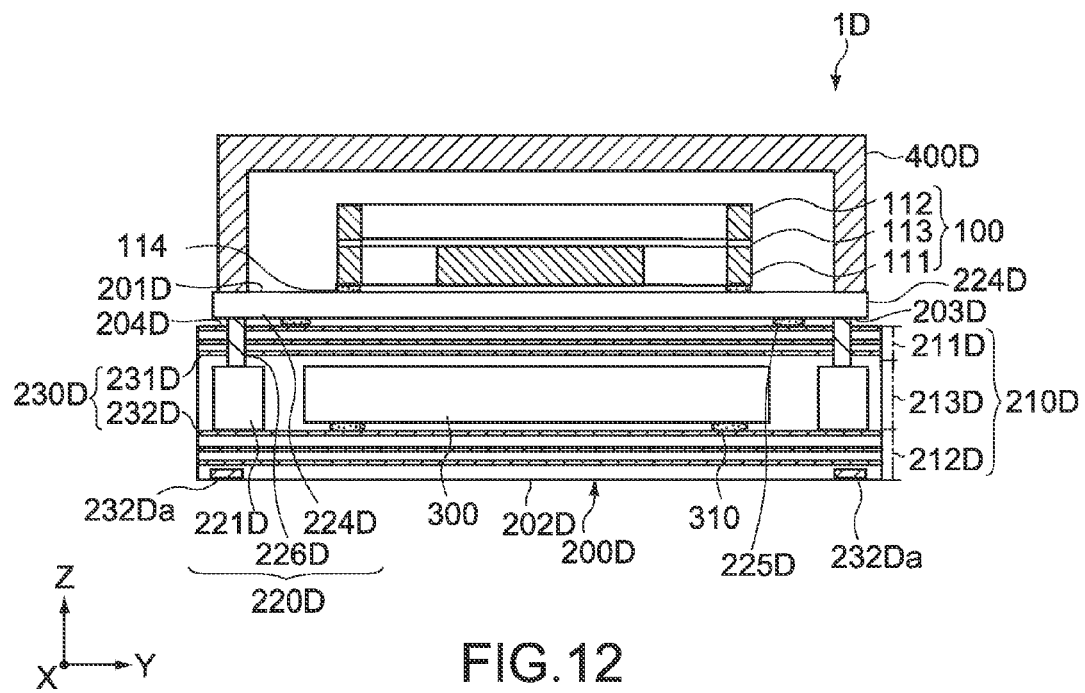
FIG. 12 is a schematic sectional view of a sensor device according to a fifth embodiment of the present technology.

FIG. 12 is a schematic sectional view of a sensor device according to a fifth embodiment of the present technology. In the drawing, like members corresponding to those of the third embodiment have like numbers, and detailed description thereof will be omitted.

A rough structure of a sensor device 1D according to the present embodiment is the same as those of the sensor devices 1B and 1C according to the third and fourth embodiments. A different point is that a regulation part 220D further includes, in addition to a base material 224D and a core part 221D, a joint part (second joint part) 226D that connects the base material 224D and the core part 221D.

The joint part 226D is formed into a columnar body where, in a hole formed inside of a substrate body 210D, a metal is filled. The joint part 226D is formed in such a manner that one end thereof abuts on the core part 221A and protrudes from a fourth joint surface 204D, and the other end abuts on a third joint surface 203D of the base material 224D. A material that forms the joint part 226D is not particularly limited. However, for example, Cu can be adopted.

Further, the joint part 226D may be formed to be connected with a wiring layer of the third joint surface 203D. Herewith, a shield part 400D, the base material 224D, the joint part 226D and the core part 221D can ensure electrical conduction and can be functioned as a large electromagnetic shield that covers up to a third region 213D of the substrate body 210D. Further, in the case where the core part 221D is electrically connected with a lower wiring layer 232D, the joint part 226D can function as a via that connects a wiring layer of the base material 224D and the lower wiring layer 232D.

The joint part 226D can be formed according to a process the same as that of the joint part 223A in the second embodiment, for example. Therefore, description of parts different from the first to third processes described in the second embodiment will be added.

For example, as the first process, a process where a metal post is inserted in a hole was cited. In the present embodiment, a metal post is polished to a height where the metal post protrudes by a predetermined amount from the fourth joint surface 204D. The height is determined by considering a height of a terminal part 225D of the base material 224D. Then, when mounting the substrate body 210D and the base material 224D, an end surface of the metal post abuts on a surface wiring of the base material 224D to form the joint part 226D.

Further, as the second process, a process where the joint part 226D is formed by plating can be cited. However, in the present embodiment, since a predetermined amount of plating is protruded from the fourth joint surface 204D, a predetermined thickness of resist is formed on the fourth joint surface 204D. Thus, the joint part 226D having the configuration can be formed.

Still further, as the third process, a process where the joint part 226D is formed with a conductive paste can be cited. However, in the present embodiment, by forming a predetermined thickness of resist on the fourth joint surface 204D, the joint part 226D protruded on the fourth joint surface 204D can be formed.

Further, in any of the first to third processes, when a joining material of a conductive paste is coated on an end surface of a columnar body that forms the joint part 226D and brought into contact with the base material 224D, mechanical strength at a joint region of the joint part 226D and the base material 224D can be more increased.

Since such the joint part 226D can fix the base material 224D and the core part 221D, the rigidity of the base material 224D can be increased. Therefore, a resonant frequency of the sensor element 100 can be more stabilized and desired vibration characteristics of the sensor element 100 can be maintained.

Further, the joint part 226D can be used as a via that electrically connects wiring layers of the base material 224D and the substrate body 210D, and can more increase freedom of wiring design. Further, the joint part 226D can be functioned as a part of an electromagnetic shield that covers the shield part 400D, the wiring layer and the controller 300. Therefore, the sensor device 1D having higher operational reliability can be provided.

Still further, since the base material 224D can be fixed to the core part 221D, by further suppressing an elastic deformation of the first joint surface 201D accompanying a vibration of the sensor element 100, the rigidity can be more increased. Therefore, a resonant frequency of the sensor element 100 can be more stabilized and desired vibration characteristics of the sensor element 100 can be maintained.

<Sixth Embodiment>

Figure 13:
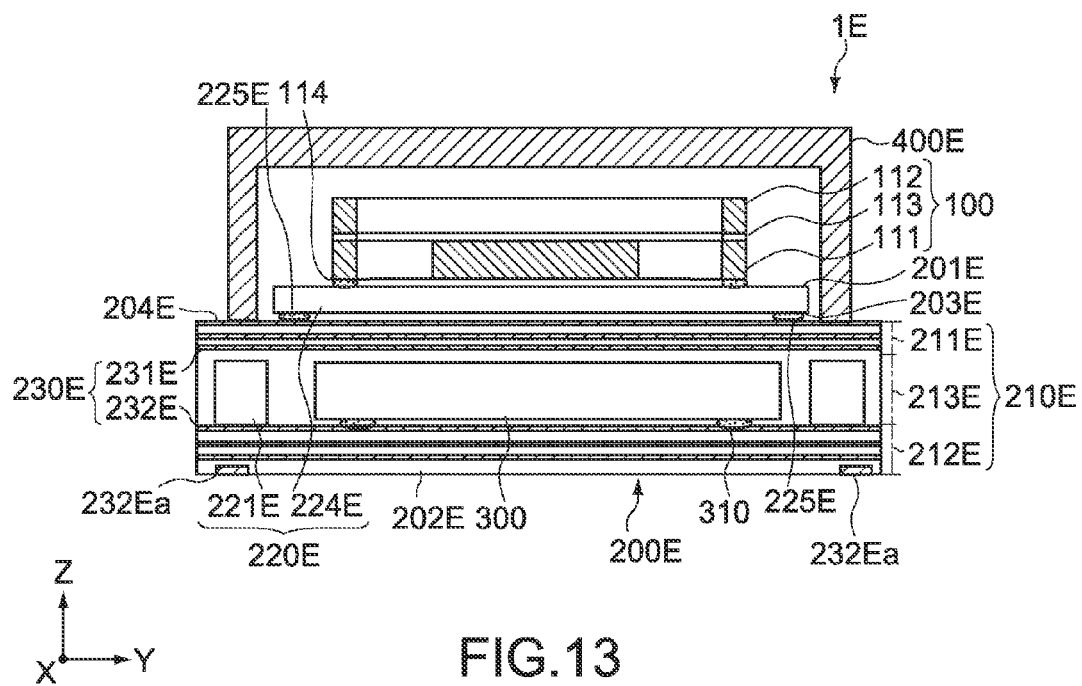
FIG. 13 is a schematic sectional view of a sensor device according to a sixth embodiment of the present technology.

FIG. 13 is a schematic sectional view of a sensor device according to a sixth embodiment of the present technology. In the drawing, like members corresponding to those of the third embodiment have like numbers, and detailed description thereof will be omitted.

A rough structure of a sensor device 1E according to the present embodiment is the same as that of the fourth embodiment. That is, a regulation part 220C includes a base material 224E and a core part 221E embedded in a substrate body 210E. On the other hand, a shield part 400E is formed to cover the base material 224E.

The base material 224E according to the present embodiment is formed in such a manner that a first joint surface 201E has an area nearly the same as an surface area of the sensor element 100. Herewith, the first joint surface 201E is formed smaller than an area that covers the shield part 400E.

The shield part 400E is disposed, in the present embodiment, not on the first joint surface 201E, but on a fourth joint surface 204E of the substrate body 210E. Herewith, the shield part 400E can cover not only the sensor element 100 but also the base material 224E. Therefore, a shielding effect of a sensor device 1E can be further increased. Further, owing to the shield part 400E, a joint region between the sensor element 100 and the base material 224E can be protected from intrusion of external humidity and moisture and external stress. Thus, the operational reliability as the sensor device 1E can be more increased.

Further, since the sensor element 100 and the base material 224E are disposed inside the shield part 400E, even when an external force is applied on the shield part 400E, an influence of the external force can be less transmitted. Therefore, the sensor device 1E is excellent in a handling property and, even when mounted on an electronic instrument as a package component, sensor characteristics can be stably maintained.

<Seventh Embodiment>

Figure 14:
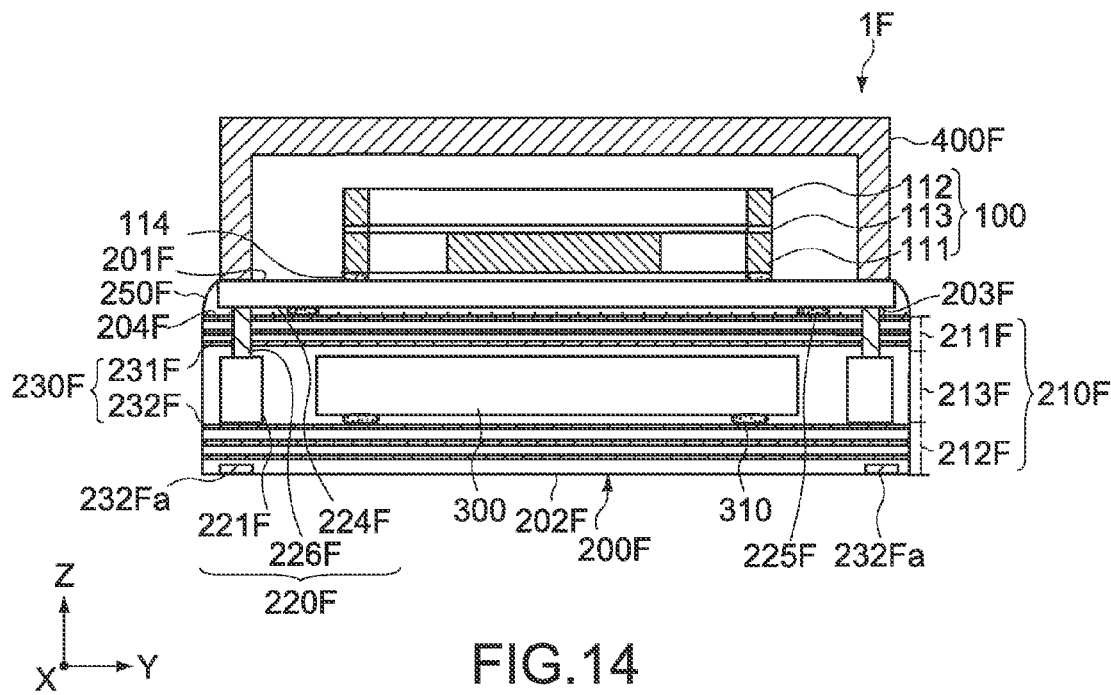
FIG. 14 is a schematic sectional view of a sensor device according to a seventh embodiment of the present technology.

FIG. 14 is a schematic sectional view of a sensor device according to a seventh embodiment of the present technology. In the drawing, like members corresponding to those of the third embodiment have like numbers, and detailed description thereof will be omitted.

A regulation part 220F according to the present embodiment is the same as the regulation part 220D according to the fifth embodiment, and has a base material 224F, a core part 221F and a joint part 226F. In the present embodiment, further, a wiring substrate 200F has an adhesive layer 250F that is filled between the base material 224F and a substrate body 210F.

In the present embodiment, the base material 224F and the substrate body 210F are, as was described above, joined by flip-chip mounting via a terminal part 225F, and an adhesive layer 250F is formed as an underfill material that covers a joint region including a terminal part 225F. As a material of such the adhesive layer 250F, for example, a resin material such as an epoxy resin can be used.

As a process for forming the adhesive layer 250F, for example, after mounting the base material 224F and the substrate body 210F by a flip-chip process, in a gap thereof, a resin material such as an epoxy resin is dropped from a needle. Then, according to a capillary tube phenomenon, the resin material is permeated into a gap between the base material 224F and the substrate body 210F and cured by heating, thus, the adhesive layer 250F is formed.

When the adhesive layer 250F is filled in between the base material 224F and the substrate body 210F, a joint region including the terminal part 225 can be protected from intrusion of external humidity and moisture or external stress. Herewith, joint reliability between the base material 224F and the substrate body 210F can be increased.

Further, owing to the adhesive layer 250F, the base material 224F can be more strongly adhered to the substrate body 210F. Herewith, the rigidity of the base material 224F can be more increased, and desired vibration characteristics of the sensor element 100 can be maintained.

A sensor device 1F according to the present embodiment may have, without limiting the above structure, structures where an adhesive layer 250E is provided to sensor devices having structures the same as those of the sensor devices 1B and 1C according to the third and fourth embodiments. Also by this, the above-described function effect can be obtained.

<Eighth Embodiment>

Figure 15:
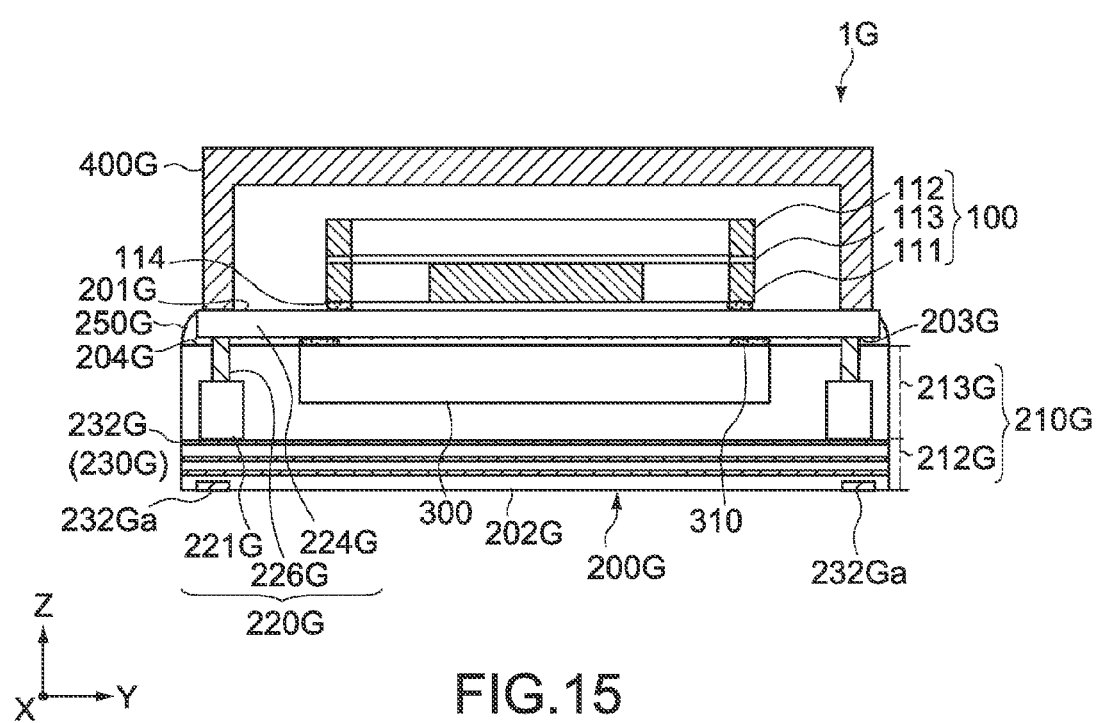
FIG. 15 is a schematic sectional view of a sensor device according to an eighth embodiment of the present technology.

FIG. 15 is a schematic sectional view of a sensor device according to an eighth embodiment of the present technology. In the drawing, like members corresponding to those of the third embodiment have like numbers, and detailed description thereof will be omitted.

A regulation part 220G according to the present embodiment is the same as the regulation part 220F according to the seventh embodiment, and has a base material 224G, a core part 221G and a joint part 226G. Further, a wiring substrate 200G has an adhesive layer 250G. Still further, a sensor device 1G according to the present embodiment has a third joint surface 203G of a substrate body 210G that is electrically joined with the controller 300.

The controller 300 according to the present embodiment is disposed inside the substrate body 210G in a state where front and back are reversed from that of the controller 300 according to the seventh embodiment. Herewith, a mounting surface of the controller 300 provided with the terminal part 310 is disposed opposite not to the lower wiring layer 232 but to the base material 224G and joined with the third joint surface 203G of the base material 224G. As a joining process, for example, a flip-chip process can be adopted.

The substrate body 210G has second and third regions 212G and 213G but does not have a first region. Accompanying this, a wiring layer 230G does not have an upper wiring layer but has only a lower wiring layer 232G. Therefore, the substrate body 210G can be formed with a thinner thickness.

Here, an example of a process of manufacturing the wiring substrate 200G according to the present embodiment will be described. The process for manufacturing the wiring substrate 200G includes the step of forming the second region 212G, the step of forming the third region 213G, and the step of joining the base material 224G, the controller 300 and the joint part 226G.

Since the step of forming the second region 212G is the same as that of the second region 212 according to the first embodiment, description thereof will be omitted. That is, by forming a wiring layer on an organic insulator layer, a single-sided or double-sided wiring substrate is manufactured and these are laminated.

In the step of forming the third region 213G, firstly, a core part 221G is joined with a part of the lower wiring layer 232G on the second region 212G. The joining is performed by a reflow process that uses a solder, for example. Next, on the second region 212G, an epoxy resin is coated in a semi-cured state.

On the other hand, on the third joint surface 203G of the base material 224G, the controller 300 and a joint part 226G are joined. As was described above, the controller 300 is mounted by a flip-chip process via the terminal part 310. The joint part 226G is joined with the base material 224G, as a columnar body molded into a predetermined length, by a process such as surface mounting or throughhole mounting.

Then, the base material 224G where the controller 300 and the joint part 226G are joined on the third joint surface 203G is joined on a resin layer in a semi-cured state. At this time, the third joint surface 203G and a resin layer are joined to face with each other, and the controller 300 and the joint part 226G are embedded in a resin layer. Then, by curing the resin layer, the third region 213G is formed. Herewith, the controller 300 and the joint part 226G can be simultaneously formed, that is, the step of manufacturing can be simplified.

Further, in the present embodiment, after forming the third region 213G, an adhesive layer 250G is formed in a gap between the base material 224G and the substrate body 210G. Herewith, a joint region can be protected from intrusion of external humidity or moisture or external stress, and joint reliability between the base material 224G and the substrate body 210F can be more increased. Further, the rigidity of the base material 224G can be increased and desired vibration characteristics of the sensor element 100 may be maintained.

A sensor device 1G according to the present embodiment has the joint part 226G. Therefore, in a manner the same as the fifth embodiment, the rigidity of the base material 224G can be increased. Further, since a structure having a shielding function of covering the sensor element 100 and the controller 300 can be adopted, the sensor device 1G high in the operational reliability can be provided.

<Ninth Embodiment>

Figure 16:
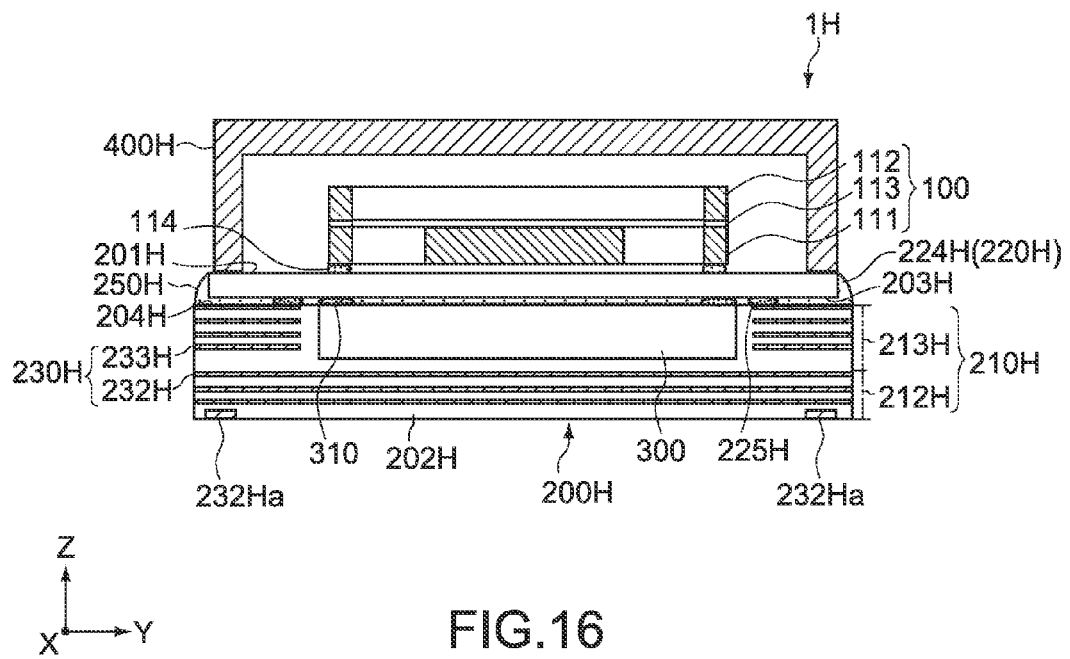
FIG. 16 is a schematic sectional view of a sensor device according to a ninth embodiment of the present technology.

FIG. 16 is a schematic sectional view of a sensor device according to a ninth embodiment of the present technology. In the drawing, like members corresponding to those of the third embodiment have like numbers, and detailed description thereof will be omitted.

A regulation part 220H according to the present embodiment has, the same as the regulation part 220B according to the third embodiment, a base material 224H. Further, the controller 300 is, the same as the eighth embodiment, joined with the base material 224H.

A substrate body 210H according to the present embodiment has a longitudinal elastic modulus smaller than that of the base material 224H. That is, the substrate body 210H is formed flexible. Herewith, when a wiring substrate 200H according to the present embodiment is mounted on a not-shown regulation substrate, a so-called damper effect can be exerted to alleviate a stress owing to mounting distortion.

For example, in the case where the wiring substrate 200H is joined with a regulation substrate, a mounting distortion owing to a temperature difference during bonding and operation is generated, and a stress may be imparted to the sensor element 100 via the substrate body 210H. Herewith, the vibration characteristics of the sensor element 100 may be affected.

Here, in the present embodiment, the substrate body 210H is formed in such a manner that a longitudinal elastic modulus thereof is smaller than that of the base material 224H configured of an inorganic insulating material such as ceramics or Si. Herewith, the stress from the regulation substrate is absorbed by the substrate body 210H, and an influence on the sensor element 100 can be suppressed.

Specifically, the substrate body 210H is formed at a value of a longitudinal elastic modulus thereof smaller by 100 GPa or more than that of the base material 224H. For example, in the case where the base material 224H is formed of ceramics, by referring to Table 1, the substrate body 210H may well be formed to have a value of 210 GPa or less. In such the substrate body 210H, as an organic insulating material, an epoxy resin that contains a very small amount of hard additive such as glass fiber is adopted. Alternatively, by adding a urethane resin softer than the epoxy resin, a longitudinal elastic modulus of an organic insulating material can be further reduced.

On the other hand, since the base material 224H to which the sensor element 100 is joined has a strong structure also when seen from a linear expansion coefficient and a longitudinal elastic modulus, even when a value of the longitudinal elastic modulus of the substrate body 210H is small, the vibration characteristics of the sensor element 100 can be maintained.

The substrate body 210H has, the same as the eighth embodiment, a second region 212H and a third region 213H. The second region 212H is formed from a multilayered wiring substrate on which a lower wiring layer 232H is formed. On the other hand, in the third region 213H, a core part is not disposed in the neighborhood of a region where the controller 300 is embedded. In the third region 213H, in the neighborhood of the controller 300, a third wiring layer 233H may be formed.

The substrate body 210H having the structure can be manufactured as shown below, for example. First, the second region 212H is formed in a manner the same as that of the first embodiment. That is, the second region 212H is manufactured by alternately laminating an organic insulating layer and a wiring layer by a build-up process. Next, also the third region 213H is manufactured in the same manner. Further, from above a fourth joint surface 204H, on a predetermined position of the third region 213H, a recess part for housing the controller 300 is formed by polishing or a laser process. Finally, the controller 300 is housed in the recess part. At this time, the controller 300 may have been joined with the base material 224H by a flip-chip process, or, simultaneously, the base material 224H and the fourth joint surface 204H may be joined by a flip-chip process.

In the present embodiment, since an insulating layer is formed of an epoxy resin and softer compared with ceramics for example, a recess part can be readily formed. Further, since the sensor element 100 is disposed on the base material 224H, a magnitude thereof is not limited by a shape of the recess part.

Further, a sensor device 1H according to the present embodiment can effectively alleviate stress imparted after mounting on a regulation substrate and the vibration characteristics of the sensor element 100 can be controlled. Therefore, the sensor device 1H having high operational reliability can be provided.

<Tenth Embodiment>

Figure 17:
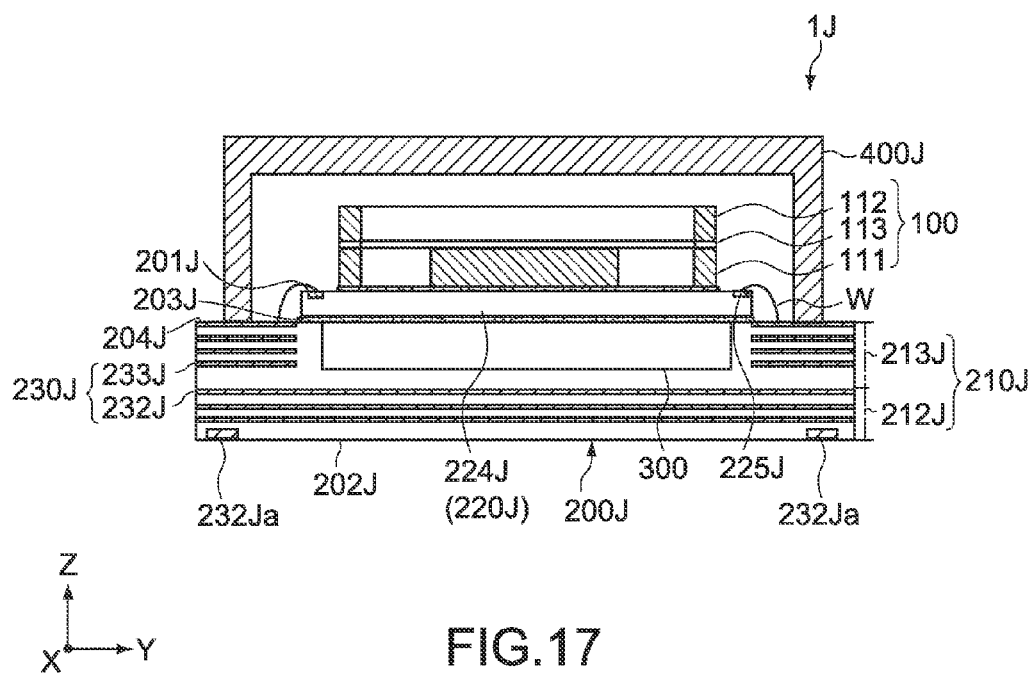
FIG. 17 is a schematic sectional view of a sensor device according to a tenth embodiment of the present technology.

FIG. 17 is a schematic sectional view of a sensor device according to a tenth embodiment of the present technology. In the drawing, like members corresponding to those of the third embodiment have like numbers, and detailed description thereof will be omitted.

A regulation part 220J according to the present embodiment has, the same as the regulation part 220B according to the third embodiment, a base material 224J. Further, the controller 300 is, the same as the eighth and ninth embodiments, joined with the base material 224J. In the present embodiment, both the sensor element 100 and controller 300 are joined with a base material 224J by a conductive joining material such as solder, and the base material 224J and a substrate body 210J are electrically joined by a wire bonding process.

The sensor element 100 is joined via a conductive joining material with a first joint surface 201J of the base material 224J and the controller 300 is joined via a conductive joining material with a third joint surface 203J of the base material 224J.

The first joint surface 201J of the base material 224J has a terminal part 225J formed in the neighborhood of the sensor element 100. The terminal part 225J is electrically connected via a wire W formed from gold (Au) with a terminal on a side of a fourth joint surface 204J of the substrate body 210J. Herewith, an electrical conduction between the base material 224J on which the controller 300 and the sensor element 100 are joined and the substrate body 210J can be ensured.

The substrate body 210J has a second region 212J and a third region 213J. The second region 212J has, the same as the respective embodiments, a multilayered wiring substrate on which a lower wiring layer 232J is formed. On the other hand, the third region 213J has a third wiring layer 233J in the neighborhood of a region where the controller 300 is buried. That is, a terminal of the fourth joint surface 204J partly forms the third wiring layer 233J.

A shield part 400J according to the present embodiment is disposed in the present embodiment on the fourth joint surface 204J of the substrate body 210J. Further, the base material 224J is formed larger than a surface area of the sensor element 100 and smaller than an area that the shield part 400J covers. Herewith, since all of the first joint surface 201J, the third joint surface 203J and a joint region containing a terminal part 225 that is joined by a wire bonding process is covered with the shield part 400J, a joint region can be protected from external stress, or intrusion of external humidity and moisture.

In the present embodiment, since a joining region of the base material 224J with the sensor element 100 and the controller 300 can be made large, a local stress owing to strain stress can be alleviated.

<Eleventh Embodiment>

Figure 18:
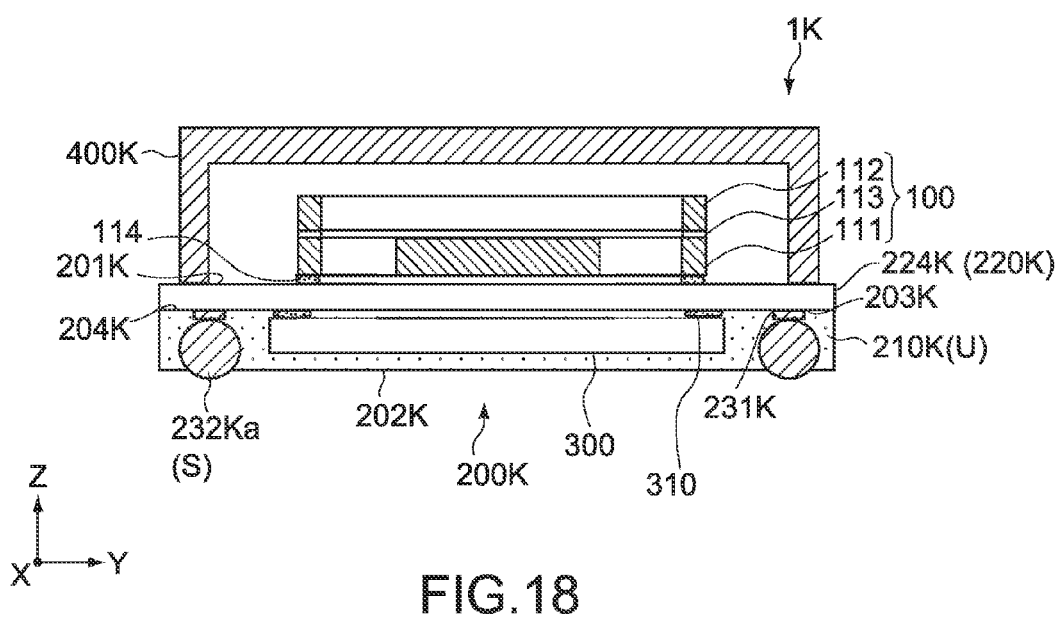
FIG. 18 is a schematic sectional view of a sensor device according to an eleventh embodiment of the present technology.

FIG. 18 is a schematic sectional view of a sensor device according to an eleventh embodiment of the present technology. In the drawing, like members corresponding to those of the third embodiment have like numbers, and detailed description thereof will be omitted.

A regulation part 220K of a sensor device 1K according to the present embodiment has, the same as the regulation part 220B according to the third embodiment, a base material 224K. Further, the controller 300 is, the same as the eighth embodiment, joined with the base material 224K via the terminal part 310.

In the present embodiment, a substrate body 210K has an external connection terminal 232Ka configured of a solder ball S such as a copper (Cu) core solder ball or a resin core solder ball. The external connection terminal 232Ka is formed to electrically connect the base material 224K and a not-shown regulation substrate. That is, the external connection terminal 232Ka is disposed on a land part 231K formed on a third joint surface 203K of the base material 224K and can be mounted on a regulation substrate by a reflow process. The land part 231K forms a wiring layer of the substrate body 210K.

In the present embodiment, the substrate body 210K is formed directly on the base material 224K. That is, the third joint surface of the base material 224K and the fourth joint surface 204K of the substrate body 210K are disposed in immediate proximity. From the viewpoint of the joinability of the land part 231K with the base material 224K, these may be joined via an adhesion layer containing gold (Au) or nickel (Ni).

The substrate body 210K contains an underfill resin U configured of an electromagnetic wave absorber as an organic insulator. Owing to such the underfill resin U, the electronic component 300 can be suppressed from being directly exposed to electrostatic noise from the regulation substrate.

Figure 19A:
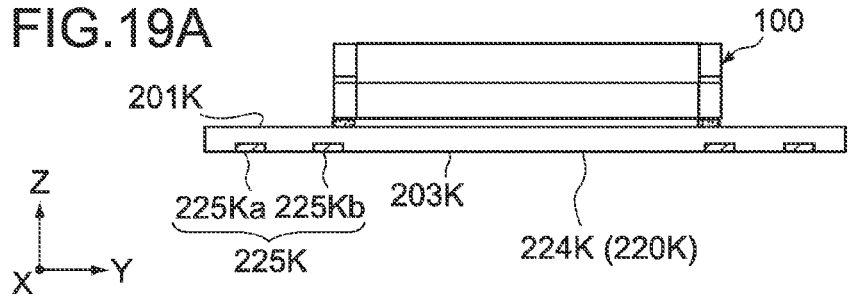
FIGS. 19A to 19D are each a schematic sectional view showing a manufacturing process of a sensor device according to an eleventh embodiment of the present technology.

FIGS. 19A to 19D are sectional views for describing the step of manufacturing the substrate body 210K of the sensor device 1K according to the present embodiment. FIG. 19A shows the base material 224K in a state where the sensor element 100 is mounted on a first joint surface 201K. On the third joint surface 203K, a terminal part 225K that forms a part of a wiring layer of the base material 224K is formed. The terminal part 225K includes a plurality of terminals 225Ka for electrically connecting with a regulation substrate via the substrate body 210K and a plurality of terminals 225Kb for electrically connecting with the controller 300. The plurality of terminals 225Ka is disposed at a predetermined distance in a periphery part of the third joint surface 203K, for example. The plurality of terminals 225Kb is disposed, for example, at a center part of the third joint surface 203K separated by a predetermined distance from each other. In FIG. 18, the terminal part 225K is omitted from showing.

Figure 19B:
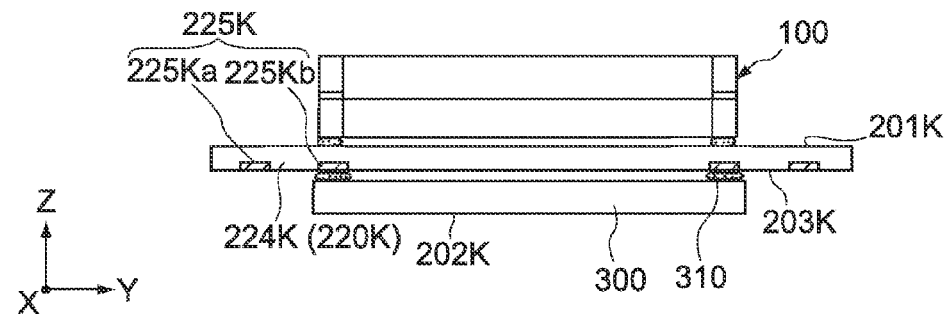

Next, on the third joint surface 203K of the base material 224K, the controller 300 is mounted via the terminal part 225Kb by a flip-chip process (FIG. 19B). Then, the land part 231K is formed on the terminal part 225Kb. A process for manufacturing the land part 231K is not particularly limited. For example, a process for manufacturing a pattern by an additive process or a subtractive process, a transfer process of a copper foil with a releasing film, or a screen printing process can be adopted.

Figure 19C:
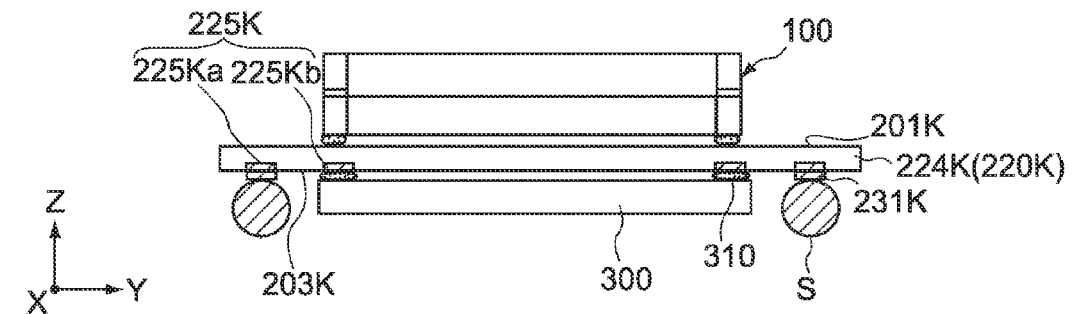
Figure 19D:
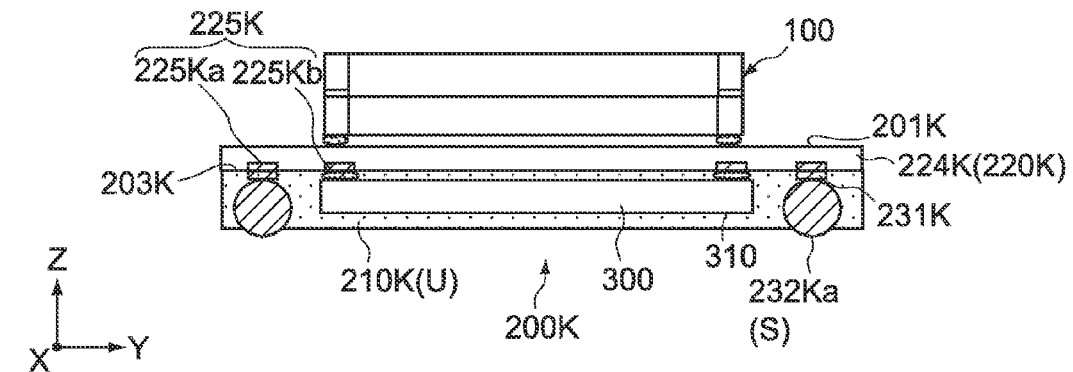

Further, solder balls S are formed on these land parts 231K (FIG. 19C). Then, the underfill resin U is filled so as to cover the controller 300 to form the substrate body 210K (FIG. 19D). At this time, a thickness of the underfill resin U is adjusted to an extent where an end part of the solder ball S is exposed. The end part forms an external connection terminal 232Ka that is connected with a regulation substrate.

As was described above, according to the present embodiment, the external connection terminal 232Ka configured of the solder ball S can ensure electrical conduction between the base material 224K and a regulation substrate and, by using the solder ball S, the substrate body 210K can be manufactured at a low cost. Further, the substrate body 210K can be manufactured by the smaller number of processes. Further, when an underfill resin U for antistatic use is used, noise from the regulation substrate can be suppressed from directly intruding into the controller 300.

Further, as a modified example of the embodiments, also the following structures can be adopted.

Figure 20:
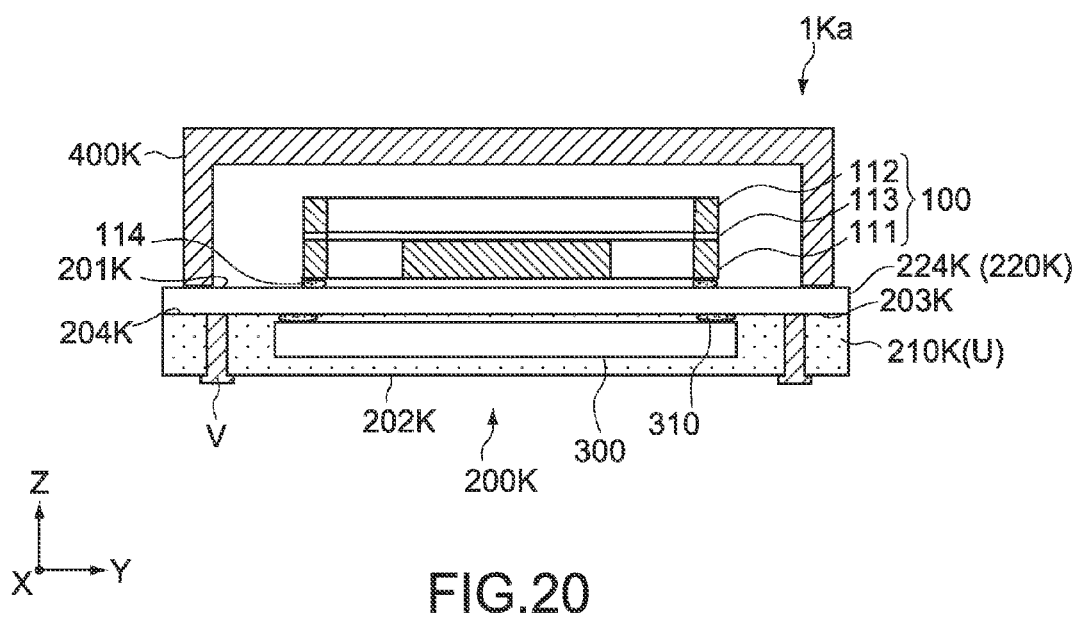
FIG. 20 is a schematic sectional view of a sensor device according to a modification example of an eleventh embodiment of the present technology.

FIG. 20 is a sectional view showing a structure of a sensor device 1Ka according to a modified example the present embodiment. In the modified example, a through via V is used as the external connection terminal 232Ka. Also with this, electrical conduction between the base material 224K and a regulation substrate can be ensured, and manufacture can be easily conducted.

As a specific manufacturing process, for example, after the controller 300 is mounted on the third junction surface 203K of the base material 224K, an underfill resin U is filled to cover the controller 300. Then, on a solidified underfill resin U, a throughhole is formed by a laser process, for example. The throughhole is formed at a position corresponding to the terminal 225Ka of the third junction surface 203K so that a bottom surface of the terminal 225Ka is exposed. Then, the throughhole is plated. As the plating process, any one of an electrolytic deposition process and an electroless deposition process can be used, and a tin-based plating process can be appropriately adopted. Further, in the case of the electrolytic deposition process, at the plating, a power feeding layer (seed layer) may be formed inside the throughhole. Thus, a through via V is formed inside the throughhole, and the through via V can ensure electric conduction between the base material 224K and the regulation substrate.

In the above, embodiments of the present technology have been described. However, the present technology is not limited thereto. On the basis of the present technological idea, various modifications are possible.

The controller 300 according to each of the present embodiments may be formed from a material having a value of a linear expansion coefficient close to that of the sensor element 100. For example, the controller 300 may be formed from a semiconductor bare chip including Si or may be formed with a cover configured of a material such as a 42 alloy, ceramics, Fe or Cu. When such the controller 300 is buried inside the substrate body 210, the first joint surface 201 can be more suppressed from deforming and vibration characteristics of the sensor element 100 can be more securely maintained.

Further, in the first and second embodiments, when the first region 211 of the substrate body 210 is formed at a thickness of 0.2 mm or less, and the sensor element 100 and the controller 300 are disposed by superposing mounting areas thereof, the first joint surface 201 can be more suppressed from deforming. That is, when the controller 300 and the sensor element 100 are brought into proximity and disposed by facing with each other, an organic insulating layer formed therebetween becomes thinner and the first joint surface 201 becomes difficult to be affected by a linear expansion coefficient and a longitudinal elastic modulus of the organic insulating layer. Therefore, stress between the terminal part 114 of the sensor element 100 and the first joint surface 201 is more alleviated. Further in this case, as was described above, the controller 300 may be formed from a material having values of a linear expansion coefficient and a longitudinal elastic modulus close to those of the sensor element 100.

Further, in the above embodiments, a structure having a core part or a base material as a regulation part was described. However, the regulation part is not limited thereto. For example, the regulation part may have an epoxy resin (organic insulating material) to which a predetermined amount of hard filler such as glass fiber is added. Also thereby, both values of a linear expansion coefficient and a longitudinal elastic modulus can be adjusted to values close to those of the sensor element. Further, a regulation part may have a wiring layer. Also by disposing many of wiring layers formed of a copper foil, both values of a linear expansion coefficient and a longitudinal elastic modulus of a substrate body can be set to values close to those of the sensor element.

Further, in the above embodiments, the sensor element 100 has been described as a gyrosensor. However, without limiting thereto, a sensor element obtained by a MEMS process of silicon or quartz may be adopted. As such the element, for example, a pressure sensor element, an acceleration sensor element or an audio sensor element (MEMS microphone) can be adopted as a sensor element. For example, when the pressure sensor element generates a stress such as strain stress between a first joint surface, factors such as an offset voltage, linearity and hysteresis are affected and sensor characteristics may change. Accordingly, such the pressure sensor as well, when applied as a sensor element related to the above embodiments, can suppress a stress at a first joint surface and stabilized sensor characteristics can be maintained.

Further, also in the embodiment described that the terminal part of the controller is disposed toward the external connection terminal side (the regulation substrate side), the terminal part may be disposed in an inverted direction, that is, toward the sensor element.

Still further, in the above embodiments, as an electronic component, the controller 300 was cited. However, the electronic component is not limited thereto. As long as an electronic component can avoid adjustment after mounting such as laser trimming and an operation thereof is not disturbed by embedding, it can be adopted, that is, a capacitor, a resistor or an earth magnetism sensor can be appropriately adopted.

The present technology can also take the following structures.

(1) A sensor device including:
 a sensor element; and
 a wiring substrate having a first joint surface electrically joined with the sensor element, a substrate body that contains an organic insulating material and in which an electronic component is embedded, and a regulation part that regulates the first joint surface from deforming.

(2) The sensor device according to the (1), in which
 the first joint surface is disposed on the substrate body; and
 the regulation part contains a core part embedded in the substrate body.

(3) The sensor device according to the (2), in which
 the core part is annually disposed around the electronic component.

(4) The sensor device according to the (3), in which
 the wiring substrate further has a second joint surface that faces the first joint surface; and
 the substrate body further has
 a first wiring layer disposed on a side of the first joint surface, and
 a second wiring layer that is disposed on a side of the second joint surface and faces the first joint surface with the core part and the electronic component interposed therebetween.

(5) The sensor device according to any one of the (2) to (4), further including a shield part that is disposed on the first joint surface and covers the sensor element is further included.

(6) The sensor device according to the (5), in which
 the regulation part further includes a first joint part that joins the shield part and the core part.

(7) The sensor device according to the (6), in which
 an absolute value of a difference of linear expansion coefficients of the shield part and the sensor element is smaller than an absolute value of a difference of linear expansion coefficients of the organic insulating material and the sensor element.

(8) The sensor device according to any one of the (2) to (7), in which
 an absolute value of a difference of linear expansion coefficients of the core part and the sensor element is smaller than an absolute value of a difference of linear expansion coefficients of the organic insulating material and the sensor element.

(9) The sensor device according to the (1), in which
 the regulation part includes a base material of an inorganic insulating material disposed between the sensor element and the substrate body, and
 the first joint surface is disposed on the base material.

(10) The sensor device according to the (9), in which
 the regulation part further includes a core part embedded in the substrate body.

(11) The sensor device according to the (10), in which
 the regulation part further includes a second joint part that joins the base material and the core part.

(12) The sensor device according to any one of the (9) to (11), in which
 the base material is mounted on the substrate body, and
 the wiring substrate further includes an adhesive layer that is filled in between the base material and the substrate body.

(13) The sensor device according to any one of the (9) to (12), in which
 the base material is disposed opposite to the first joint surface and further includes a third joint surface that is electrically joined with the electronic component.

(14) The sensor device according to any one of the (9) to (13), further including a shield part that is disposed on the wiring substrate and covers the sensor element.

(15) The sensor device according to the (14),
 in which the shield part is disposed on the first joint surface.

(16) The sensor device according to the (15), in which
 the substrate body includes a fourth joint surface that faces the base material; and
 the shield part is disposed on the fourth joint surface and covers the base material and the sensor element.

(17) The sensor device according to any one of the (9) to (16), in which the substrate body has a longitudinal elastic modulus smaller than that of the base material.

(18) The sensor device according to any one of the (1) to (17), in which the sensor element faces the electronic component with the first joint surface interposed therebetween.

(19) The sensor device according to any one of the (1) to (18), in which the sensor element is a gyrosensor.

The present technology contains subject matter related to that disclosed in Japanese Priority Patent Application JP 2012-149228 filed in the Japan Patent Office on Jul. 3, 2012, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A sensor device comprising:
   a sensor element; and
   a wiring substrate comprising:
      a first joint surface electrically joined with the sensor element,
      a substrate body that contains an organic insulating material and in which an electronic component is embedded, and
      a regulation part that regulates deformation of the first joint surface caused by thermal expansion or contraction of the sensor element.

2. The sensor device according to claim 1, wherein
   the first joint surface is disposed on the substrate body; and
   the regulation part includes a core part embedded in the substrate body.

3. The sensor device according to claim 2, wherein
   the core part is annularly disposed around the electronic component.

4. The sensor device according to claim 3, wherein
   the wiring substrate further includes a second joint surface that faces the first joint surface; and
   the substrate body further includes
      a first wiring layer disposed on a side of the first joint surface, and
      a second wiring layer that is disposed on a side of the second joint surface and faces the first wiring layer with the core part and the electronic component interposed therebetween.

5. The sensor device according to claim 2, further comprising a shield part that is disposed on the first joint surface and covers the sensor element.

6. The sensor device according to claim 5, wherein
   the regulation part further includes a first joint part that joins the shield part and the core part.

7. The sensor device according to claim 6, wherein
   an absolute value of a difference of linear expansion coefficients of the shield part and the sensor element is smaller than an absolute value of a difference of linear expansion coefficients of the organic insulating material and the sensor element.

8. The sensor device according to claim 2, wherein
   an absolute value of a difference of linear expansion coefficients of the core part and the sensor element is smaller than an absolute value of a difference of linear expansion coefficients of the organic insulating material and the sensor element.

9. The sensor device according to claim 1, wherein
   the regulation part includes a base material of an inorganic insulating material disposed between the sensor element and the substrate body; and
   the first joint surface is disposed on the base material.

10. The sensor device according claim 9, wherein
    the regulation part further includes a core part embedded in the substrate body.

11. The sensor device according to claim 10, wherein
    the regulation part further includes a second joint part that joins the base material and the core part.

12. The sensor device according to claim 9, wherein
    the base material is mounted on the substrate body; and
    the wiring substrate further includes an adhesive layer that is filled in between the base material and the substrate body.

13. The sensor device according to claim 9, wherein
    the base material is disposed opposite to the first joint surface and further includes a third joint surface that is electrically joined with the electronic component.

14. The sensor device according to claim 9, further comprising a shield part that is disposed on the wiring substrate and covers the sensor element.

15. The sensor device according to claim 14, wherein
    the shield part is disposed on the first joint surface.

16. The sensor device according to claim 15, wherein
    the substrate body includes a fourth joint surface that faces the base material; and
    the shield part is disposed on the fourth joint surface and covers the base material and the sensor element.

17. The sensor device according to claim 9, wherein
    the substrate body has a longitudinal elastic modulus smaller than that of the base material.

18. The sensor device according to claim 1, wherein
    the sensor element faces the electronic component with the first joint surface interposed therebetween.

19. The sensor device according to claim 1, wherein
    the sensor element is a gyrosensor.

* * * * *